United States Patent [19]
Ichikawa et al.

[11] Patent Number: 5,291,463
[45] Date of Patent: Mar. 1, 1994

[54] OPTICAL CARD REPRODUCING APPARATUS FOR REPRODUCING INFORMATION WITH A TWO-DIMENSIONAL SOLID-STATE IMAGING DEVICE

[75] Inventors: Kaori Ichikawa, Koganei; Takumi Sugaya, Hachioji, both of Japan

[73] Assignee: Olympus Optical Co., Ltd., Tokyo, Japan

[21] Appl. No.: 971,066

[22] Filed: Nov. 3, 1992

[30] Foreign Application Priority Data

Nov. 5, 1991 [JP] Japan ................. 3-288899
Dec. 17, 1991 [JP] Japan ................. 3-333662
Dec. 17, 1991 [JP] Japan ................. 3-333663

[51] Int. Cl.$^5$ ........................................... G11B 11/00
[52] U.S. Cl. .................................. 369/13; 369/54; 235/456
[58] Field of Search ............ 369/13, 32, 44.26, 44.28, 369/44.29, 44.34, 44.36, 44.39, 47, 48, 54, 58, 59, 98, 112, 116, 275.3; 360/59, 114; 235/456, 436, 476, 470, 475, 488

[56] References Cited

U.S. PATENT DOCUMENTS 5,237,550 8/1993 Nakajima et al. ................. 369/48

Primary Examiner—Steven Mottola
Assistant Examiner—Ali Neyzari
Attorney, Agent, or Firm—Armstrong, Westerman, Hattori, McLeland & Naughton

[57] ABSTRACT

A CMD (change moduation device) control circuit in an optical card reproducing apparatus comprises a data interval detector which detects a data pit interval from a binary valued signal from a binary value converter and from a row and a column addresses generated by a row address generator and a column address generator, respectively, during scanning of a CMD sensor with a row address generator and a column address generator, a track guide column address detector for detecting a column address of a track guide from the binary valued signal by scanning the CMD sensor, and a decoder for decoding a recorded data from the data pit intervals detected by the data interval detector. In this optical card reproducing apparatus, the decoding is carried out directly from the recorded data pit intervals without moving the optical card during the reproducing operation. Thus, accurate decoding or reproducing of the data can be achieved.

23 Claims, 24 Drawing Sheets

OPTICAL CARD REPRODUCING APPARATUS FOR REPRODUCING INFORMATION WITH A TWO-DIMENSIONAL SOLID-STATE IMAGING DEVICE

BACKGROUND OF THE INVENTION

1. Field of the Invention

The present invention relates to an optical card reproducing apparatus for reproducing information recorded on an optical card with light, more specifically, to an optical card reproducing apparatus having a two-dimensional solid-state image sensing means comprising plural photoelectric conversion elements which are distributed two-dimensionally on a plane wherein any photoelectric conversion element can be specified by a first address in the X-direction and a second address in the Y-direction.

2. Statement of Related Art

In general, in a conventional way to read a sequence of pits recorded on an optical card, the card is moved in the direction of a track so as to scan a sequence of the pits one-dimensionally with a spot light, such as a laser beam, and the sequential data signals obtained by a detector are decoded.

As described in Japanese Patent Application Laid-Open No. 2-223064, in reproduction of data recorded by the self-clock modulation method, data is reproduced by reading each distance between data pits. A light beam emitted from a semiconductor laser is converged onto an optical card through an optical system, so that an optical spot is produced. The light beam is reflected by the surface of the optical card and detected by a photodiode.

The existence of pits can be detected by judging the amount of the reflected light, thus a pit detection signal is retrieved. In reproduction of signals recorded by the self-clock modulation method, the synchronizing signal is produced as a clock signal using a PLL or the like by extracting it from the pit detection signals. A decoded data is produced from the pit detection signals at the timing of the synchronizing signals. The pit detection signal is extracted sequentially from a recording medium moving in the direction of a track. Therefore, the detection rate of the pit detection signal depends on a driving speed of an electric motor for driving an optical card. Reading and writing of data are usually started when a specific pattern, so-called sync pattern, is detected from demodulation data.

Japanese Patent Application Laid-Open No. 2-141932 by the present applicant discloses an optical card reproducing apparatus wherein a plurality of tracks are read at the same time by applying one or more light beams to the plurality of tracks. In this optical card reproducing apparatus, data on each track is read by a detecting device or the like. One detecting device is assigned to each track and each detector works independently. Even in this optical card reproducing apparatus, as in that described above in Japanese Patent Application Laid-Open No. 2-223064, signals are detected in sequence and the detection rate also depends on a driving speed of an electric motor.

As described above, in a system wherein pits recorded on an optical card are scanned with a light beam by driving a card and detection signals are read sequentially, the driving of a card by an electric motor leads to a fluctuation in the moving speed of the card, and further leads to a fluctuation in the interval time between each pit detection signal. Therefore, even if pits were recorded at an accurate interval at the time of recording, fluctuations in the interval of pit signals would occur during reading signals due to fluctuations in driving speed. When such a fluctuation is too large or when a certain sudden signal fluctuation is added to the fluctuation in driving speed, an appropriate clock signal cannot be generated resulting in an inability to read data. Furthermore, failure in detection of a sync pattern results in an inability to determine when to start reading/writing data, thus it becomes unable to read/write data. That is, when there exists some dust or a defect on a track to be accessed, or when large fluctuations in signals exist due to fluctuations in speed because of back-and-forth movement of a card, a clock signal cannot be appropriately generated or a sync pattern cannot be detected. Thus there is a problem that it is impossible to read data.

In the case of a write-once medium such as an optical card, a decision is required whether the area to be recorded is a blank area or a used area before writing is carried out so as to assure that the data is going to be written in an area which is really blank. When an area turns out to be already previously written generally, the area will be skipped. Therefore, it is required to make an accurate decision of a blank (no-date is recorded) track.

If data was re-written by mistake in a recorded area (that is, duplication occurs in writing) in a writing process, it would become impossible not only to read the data recorded later but also the previously recorded data. Moreover, in a reading process, it is wasteful to decode duplicated signals unless duplication is judged.

As described above, in conventional technologies, pits recorded on an optical card are scanned with a light beam to read the pit signals sequentially. During this process for reading the signals sequentially, there is some probability that some disturbance causes wrong decision that a recorded track is taken as a blank track (no-data track), or that a duplicated track is taken as a normal track to make useless and inaccurate decoding.

SUMMARY OF THE INVENTION

It is an object of the present invention to provide an optical card reproducing apparatus which can perform accurate reproduction of information with no effect from fluctuation in the driving speed of a card.

It is another object of the present invention to provide an optical card reproducing apparatus which can perform accurate reading and writing even in case of failure to obtain a sync pattern on a targeted track due to some dust or defects or a fluctuation in driving speed of an electric motor.

It is a further object of the present invention to provide an optical card reproducing apparatus which can perform reliable writing and quick reading by making an accurate and quick decision regarding a state of a recording area of a card.

In the present invention, an optical card reproducing apparatus for reproducing information on an optical card which has, on its recording surface, a plurality of tracks for recording information as a sequence of pits and track guides for separating these tracks, comprises: an irradiation means for irradiating a light beam and focusing the light beam on the recording surface of the optical card; a two-dimensional solid-state image sensing means for sensing images on the recording surface of the optical card with the light beam from the irradiation means, including a plurality of photoelectric conversion elements distributed on a plane wherein each photoelectric conversion element can be specified by a row address in the row-direction and a column address in the column-direction; a row address generating means for generating the row address of the plurality of photoelectric conversion elements; a column address generating means for generating the column address of the plurality of photoelectric conversion elements; a binary value conversion means for converting image signals from the two-dimensional solid-state imaging device into binary values; a track guide detection means for detecting the row address or column address of the track guide from an image of the track guide formed on the two-dimensional solid-state imaging device; a first calculation means for calculating either the row address or column address of the sequence of pits from the row address or column address of the track guide detected by the track guide detection means; and a detection means for detecting the sequence of pits from binary valued signals outputted from the binary value converting means by setting a row address or column address of the sequence of pits, which is calculated by the first calculation means, into either the row address generating means or the column address generating means, respectively, and by sequentially changing over the address generating means which is not set to an address increasing by one address, on the basis of a predetermined address. In this optical card reproducing apparatus, the track guide detection means detects the address of the track guide, then the first calculation means calculates the address of the sequence of pits from the address of the track guide and the detection means detects an interval between the pits in sequence.

BRIEF DESCRIPTION OF THE DRAWINGS

FIGS. 1-10 relate to the first embodiment of the present invention wherein:

FIG. 1 is a schematic diagram illustrating the structure of an optical card reproducing apparatus;

FIG. 2 is a block diagram showing the structure of a CMD control circuit;

FIG. 3 is a schematic diagram for explanation of the structure of an optical card;

FIG. 4 is a schematic diagram for explanation of a recording pattern on an optical card;

FIG. 5 is a schematic diagram of the structure of a CMD sensor;

FIG. 6 is a timing chart showing a basic operation of a CMD sensor;

FIG. 7 is a flowchart showing an operation flow for reading an optical card;

FIG. 8 is a schematic diagram for explanation of the operation of reading an optical card with a CMD sensor;

FIG. 9 is a timing chart of track guide detection; and

FIG. 10 is a timing chart of data pit detection.

FIGS. 11A to 11B and 12 relate to the second embodiment of the present invention wherein:

FIGS. 11A to 11B is a schematic diagram for explanation of the operation of reading an optical card with a CMD sensor; and FIG. 12 is a flowchart showing the operation flow for reading an optical card with a CMD sensor.

FIGS. 13-16 relate to the third embodiment of the present invention wherein:

FIG. 13 is a block diagram showing the structure of CMD control circuit;

FIG. 14 is a flowchart showing the operation flow for reading an optical card with a CMD sensor.

FIG. 15 is a schematic diagram for explanation of the operation of reading an optical card with a CMD sensor; and FIG. 16 is a timing chart of data pit detection.

FIGS. 17-20 relate to the fourth embodiment of the present invention wherein:

FIG. 17 is a block diagram showing the structure of CMD control circuit;

FIG. 18 is a schematic diagram for explanation of the structure of an optical card;

FIG. 19 is a flowchart showing the operation flow for reading an optical card with a CMD sensor; and FIG. 20 is a schematic diagram for explanation of the recording state of an optical card and for explanation of addition signals.

FIGS. 21-23 relate to the fifth embodiment of the present invention wherein:

FIG. 21 is a block diagram showing the structure of CMD control circuit;

FIG. 22 is a flowchart showing the operation flow for reading an optical card with a CMD sensor; and FIG. 23 is a schematic diagram for explanation of the recording state of an optical card and for explanation of addition signals.

FIGS. 24-28 relate to the sixth embodiment of the present invention wherein:

FIG. 24 is a block diagram showing the structure of CMD control circuit;

FIG. 25 is a flowchart showing the operation flow for reading an optical card with a CMD sensor;

FIG. 26 is a schematic diagram for explanation of the operation of reading an optical card with a CMD sensor;

FIG. 27 is a timing chart of data pit detection; and

FIG. 28 is a schematic diagram for explanation of the operation of generating a sequence of data supplied to a decoding circuit.

DETAILED DESCRIPTION OF THE PREFERRED EMBODIMENTS

Figure 1:
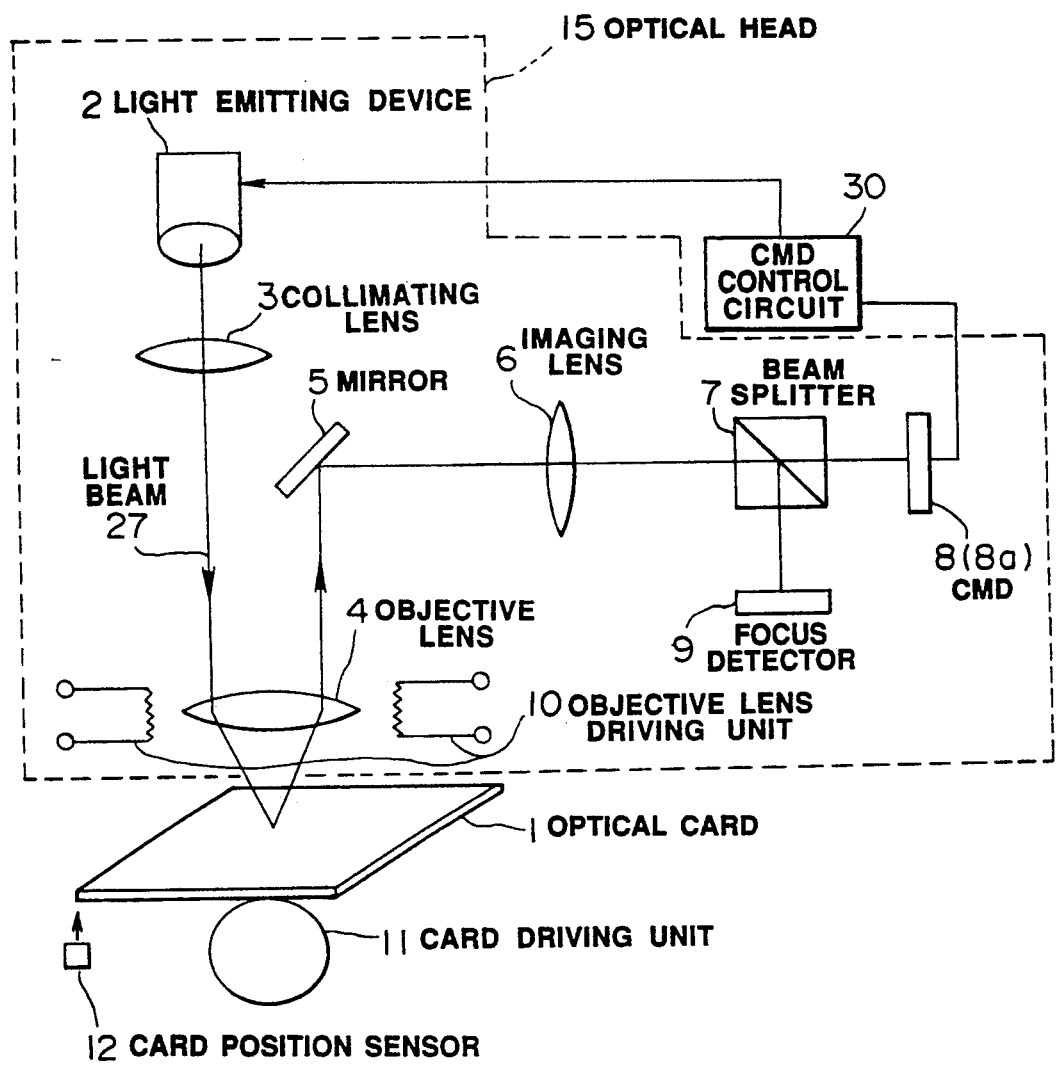

Referring to the Figures, a first embodiment of the present invention will be described. As described in FIG. 1, an optical card reproducing apparatus of the first embodiment comprises: a light emitting device 2, consisting of a semiconductor laser or the like, for generating a light beam 27 to be applied to an optical card 1 on which information is stored; a collimating lens 3 for collimating the light beam 27 emitted by the light emitting device 2; an objective lens 4 for focusing the light beam collimated with the collimating lens 3 on the recording surface of the optical card, a mirror 5 for reflecting, at a desired angle, for example a right angle, the light beam 27 which comes passing through the objective lens 4 after reflecting at the recording surface of the optical card 1; an imaging lens 6 for focusing the light beam 27, which comes after reflecting at the mirror 5, on a CMD (charge modulation device) sensor 8 via a beam splitter 7; a CMD control circuit 30 for driving and controlling the CMD sensor 8; a focus detector 9 for detecting the focusing state of the light beam 27 coming through the imaging lens 6 and through the beam splitter 7 after reflecting at the mirror 5; an objective lens driving unit 10 for focusing the objective lens 4 by controlling it based on the focusing state detected by the focus detector 9; a card driving unit 11 for driving the optical card 1 to move back and forth in the direction of a track, which will be described later; and a card position sensor 12 for detecting the position of the optical card 1 to make a decision of whether the optical card 1 driven by the card driving unit 11 is located at the desired position.

In this optical card reproducing apparatus, the light emitting device 2, the collimating lens 3, the objective lens 4, the mirror 5, the imaging lens 6, the beam splitter 7, the CMD sensor 8, the focus detector 9, and the objective lens driving unit 10 constitute an optical head 15. With a moving means such as a voice coil motor, (not shown) the optical head 15 can be moved in a direction perpendicular to the direction of the track on the optical card, which will be described later. Here, the imaging lens 6, the beam splitter 7, the CMD sensor 8, and the focus detector 9 may be placed at the fixed position. In this case, the direction of the optical axis from the mirror 5 to the imaging lens 6 is perpendicular to the direction of the track, therefore, the optical axis from the mirror 5 to the imaging lens 6 can remain unchanged even if the optical head 15 is moved.

Figure 3:
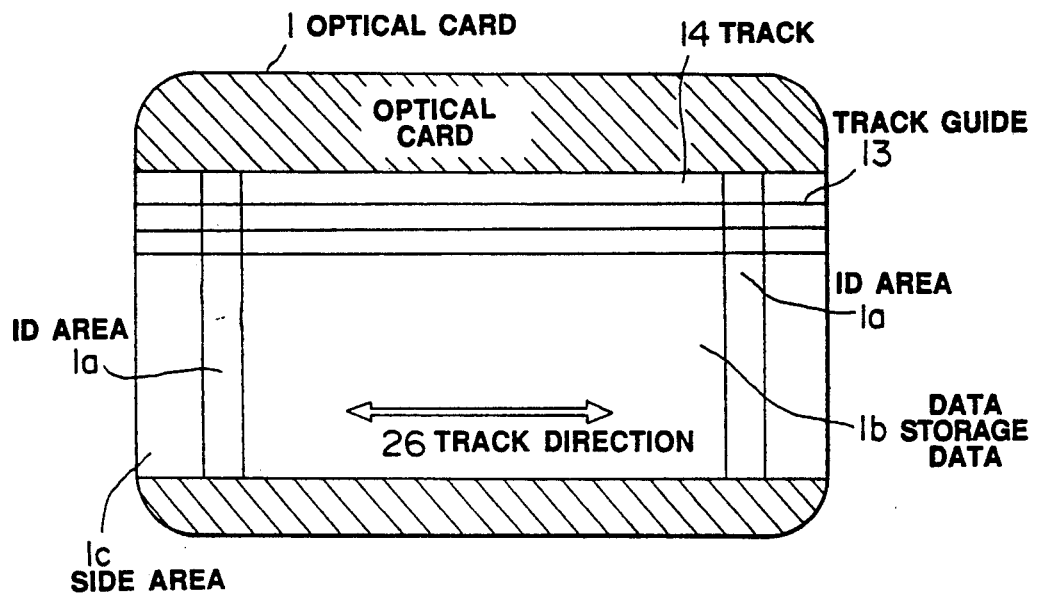

As shown in FIG. 3, the optical card 1 includes a plurality of track guides 13 formed in the shape of straight lines in the track direction 26, i.e., in the longer direction (longitudinal direction) of the optical card 1, and also includes a plurality of tracks 14 with data recorded on them which are formed between track guides 13. Each track 14 comprises an ID area 1a recording ID data, such as a track number of the track 14, and data storage area 1b storing recording data, wherein both these areas are formed along the track direction 26 of the optical card 1. The optical card 1 includes a side area 1c on a side of it where only the track guides 13 are formed.

Figure 4:
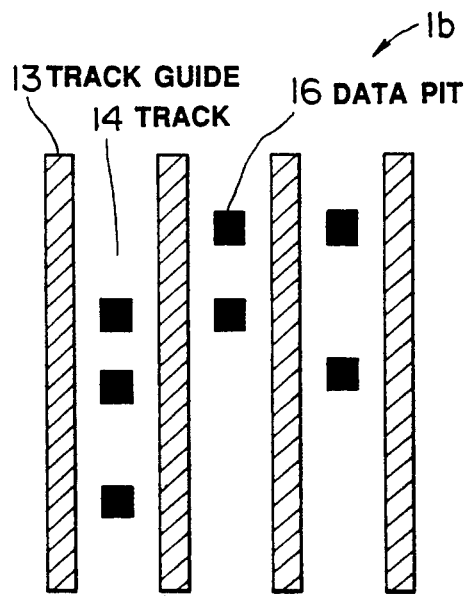

In the data storage area 1b, as shown in FIG. 4, there are data pits 16 recorded on the tracks 14 between the track guides 13 wherein the data pits have a reflection factor different from that of the area other than data pits. Similarly, the ID data, not shown in Figures, are recorded in the ID area 1a with pits having a reflection factor different from that of the area other than the pits.

Figure 5:
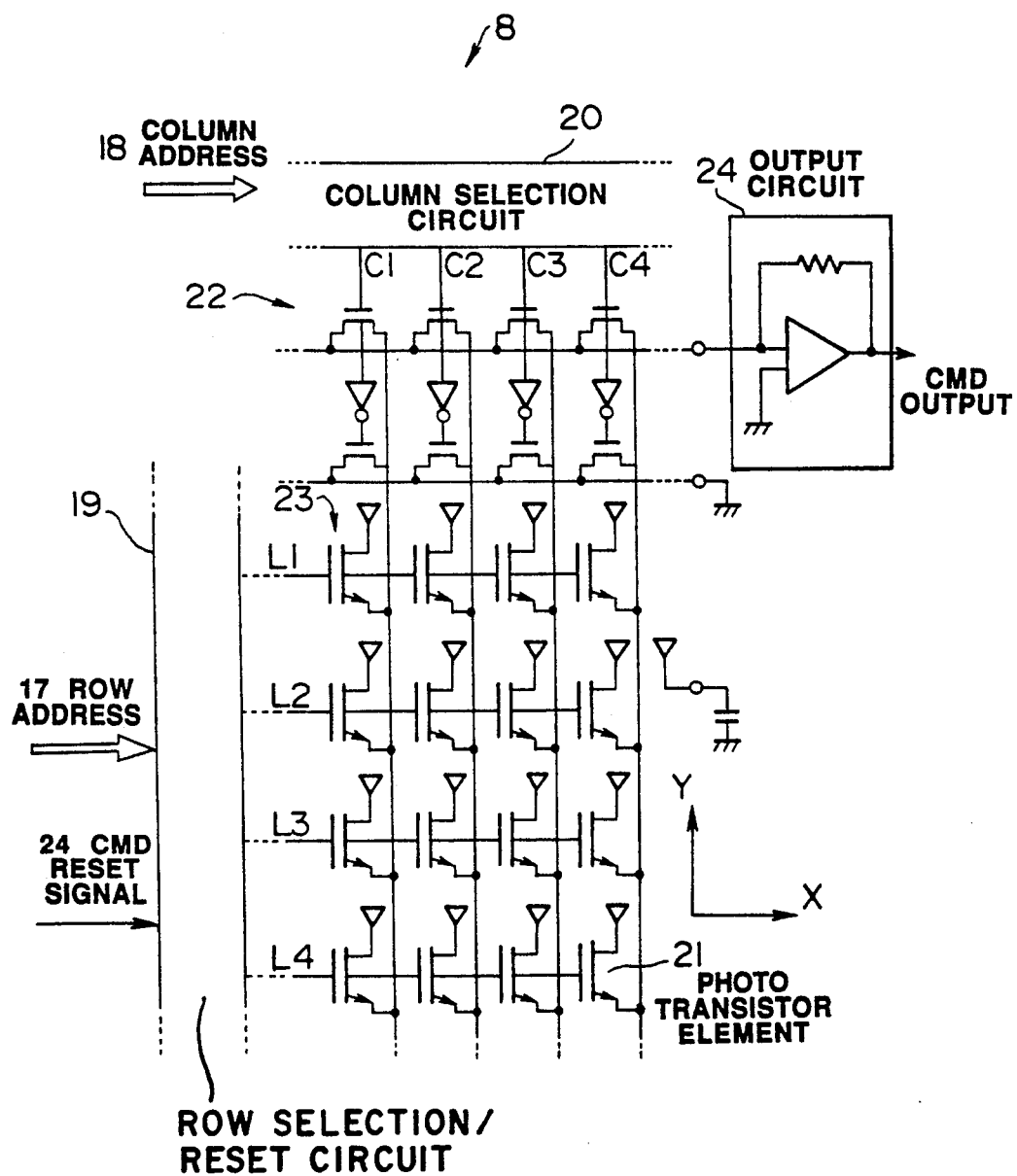

As shown in FIG. 5, the CMD sensor 8 comprises a set of two-dimensionally distributed MOS-type photo transistor CMDs, wherein non-destructive signal reading is possible from any photo transistor element 21 by specifying addresses of the X-direction (row direction) and Y-direction (column direction). For example, when '1' is given to both the row address 17 and the column address 18, these address data are decoded by a row selection circuit 19 and a column selection circuit 20 to make column C1 and row L1 active, thus a MOS-switch 22 turns on and a photo transistor element on row L1 is selected to detect the charge stored in a photo transistor element 23 located at the cross of row L1 and column C1. Then, the detected charge is amplified by an output circuit 24, which is an amplifier, and the amplified signal is outputted as a CMD output.

Figure 6:
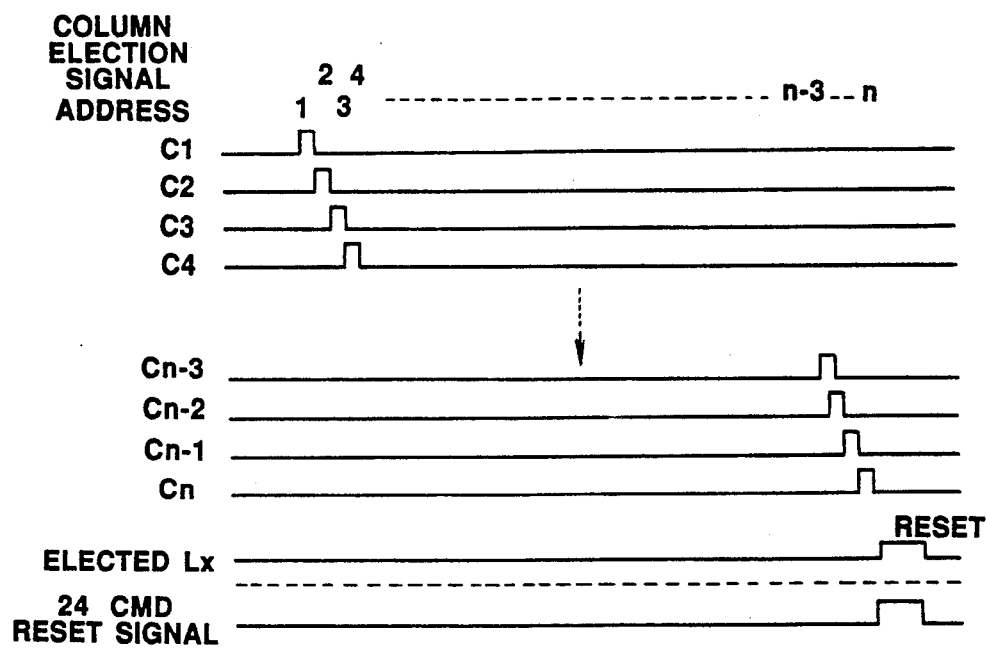

As shown in FIG. 6, therefore, in a scan process along a specific row LX, the row selection circuit 19 makes the row LX active, while the column selection circuit 20 selects sequentially rows C1, C2 . . . , Cn. In a reset process, both LX and CMD reset signal 24 are made active at the same time, so that charges stored in photo transistor elements will be discharged to be reset. The detail of CMD elements is disclosed in "Gate Storage Type MOS Photo Transistor Image Sensor", The Journal of the Institute of Television Engineers of Japan, Vol. 41, No. 11 (1987). Therefore, the detailed description of the CMD elements will not be given herein.

Figure 2:
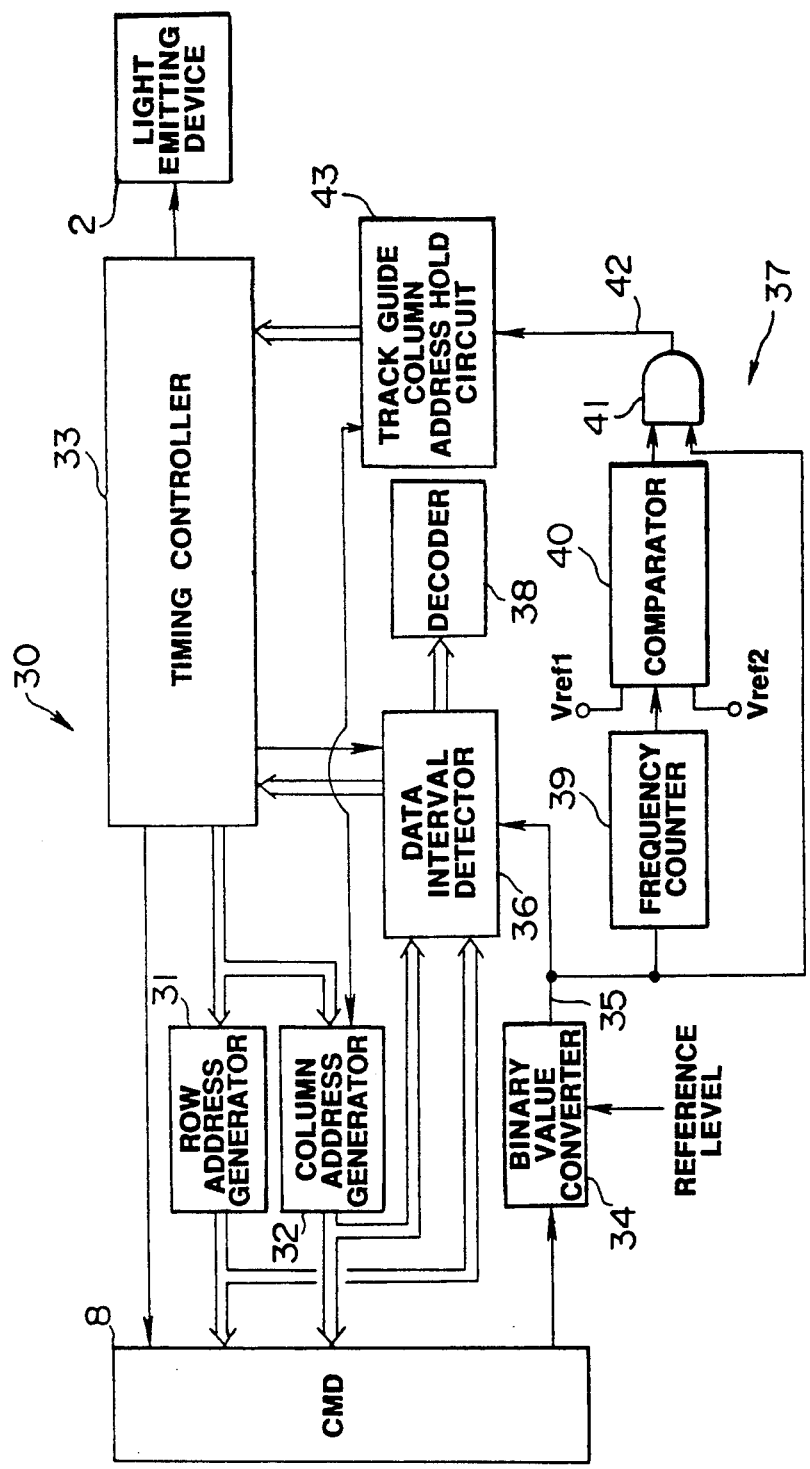

As shown in FIG. 2, the CMD control circuit 30 includes a row address generator 31 for generating row addresses of the CMD sensor 8, a column address generator 32 for generating column addresses of the CMD sensor 8, a timing controller 33 for specifying the timing of emission of the light beam from the light emitting device 2 and for giving specified addresses to the row address generator 31 and the column generator 32, and a binary value converter 34 for converting the output of the CMD sensor 8 corresponding to the row and column addresses generated by the row address generator 31 and the column address generator 32, respectively, into a binary value by comparing the output of the CMD sensor 8 with the predetermined reference level.

The CMD control circuit 30 further includes a data interval detector 36 for detecting the interval between the adjacent data pits 16 (FIG. 4) using the row address and the column address generated from the row address generator 31 and the column address generator 32, respectively, for scanning the CMD sensor 8 and also using the binary valued signal 35 obtained from the binary value converter 34 during the scanning, a track guide column address detector 37 for detecting the column address of the track guide similarly using the binary valued signal 35 obtained by scanning the CMD sensor 8, and a decoder 38 for decoding the recorded data from the interval value between the data pits 16 (FIG. 4) detected by the data interval detector 36. The data interval detector 36 can easily detect the interval between the data pits by calculating the difference in the row address and the column address between two pits.

The track guide column address detector 37 comprises a frequency counter 39 which converts the frequency of the binary valued signal 35, for example, into voltage, and measures it by scanning the CMD sensor 8, a comparator 40 for deciding whether the voltage given by the frequency counter 39 is between the desired predetermined values Vref1 and Vref2, a gate circuit 41 which gives the binary valued signal 35 as its output signal only when the comparator 40 decides that the voltage given by the frequency counter 39 was between the desired values Vref1 and Vref2, and a track guide column address holding circuit 43 which holds the column address of the track guide corresponding to a binary valued signal 42 of a predetermined frequency outputted from the gate circuit 41 by inputting the binary valued signal 42 and the column address of the CMD sensor 8 scanned by the timing controller 33.

The reference voltages Vref1 and Vref2 are predetermined, so that a voltage between Vref1 and Vref2 is a voltage corresponding to a frequency of binary valued signals which will be reproduced when the CMD sensor 8 scans only the track guide 13. Thus, the comparator 40 can detect whether the binary valued signal 35 corresponds to the track guide 13.

Figure 7:
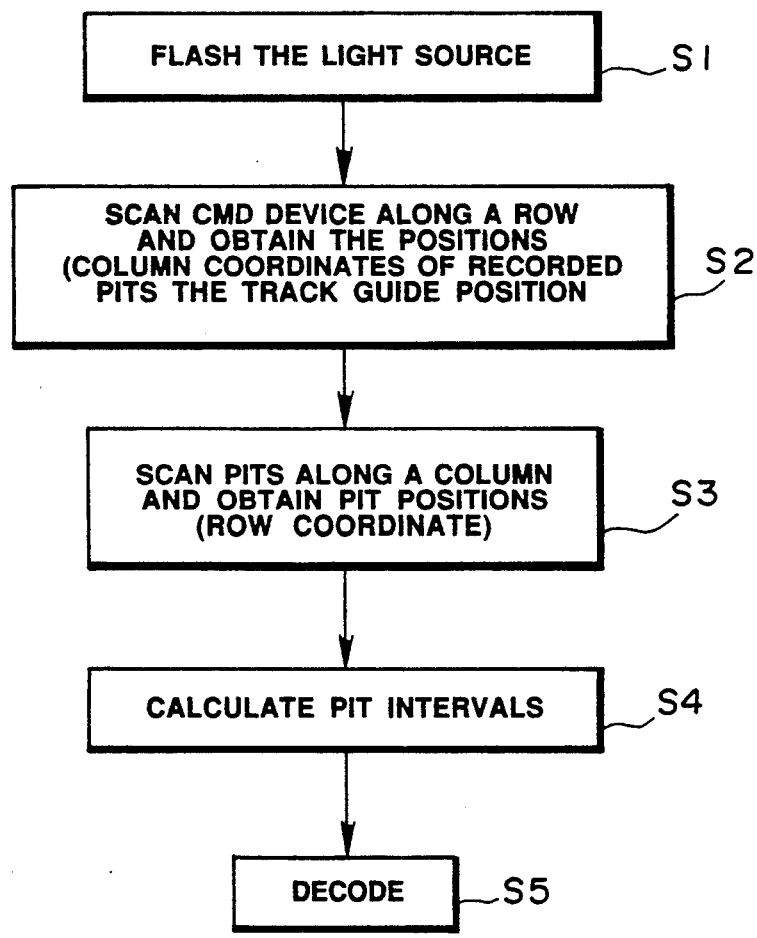
Figure 8:
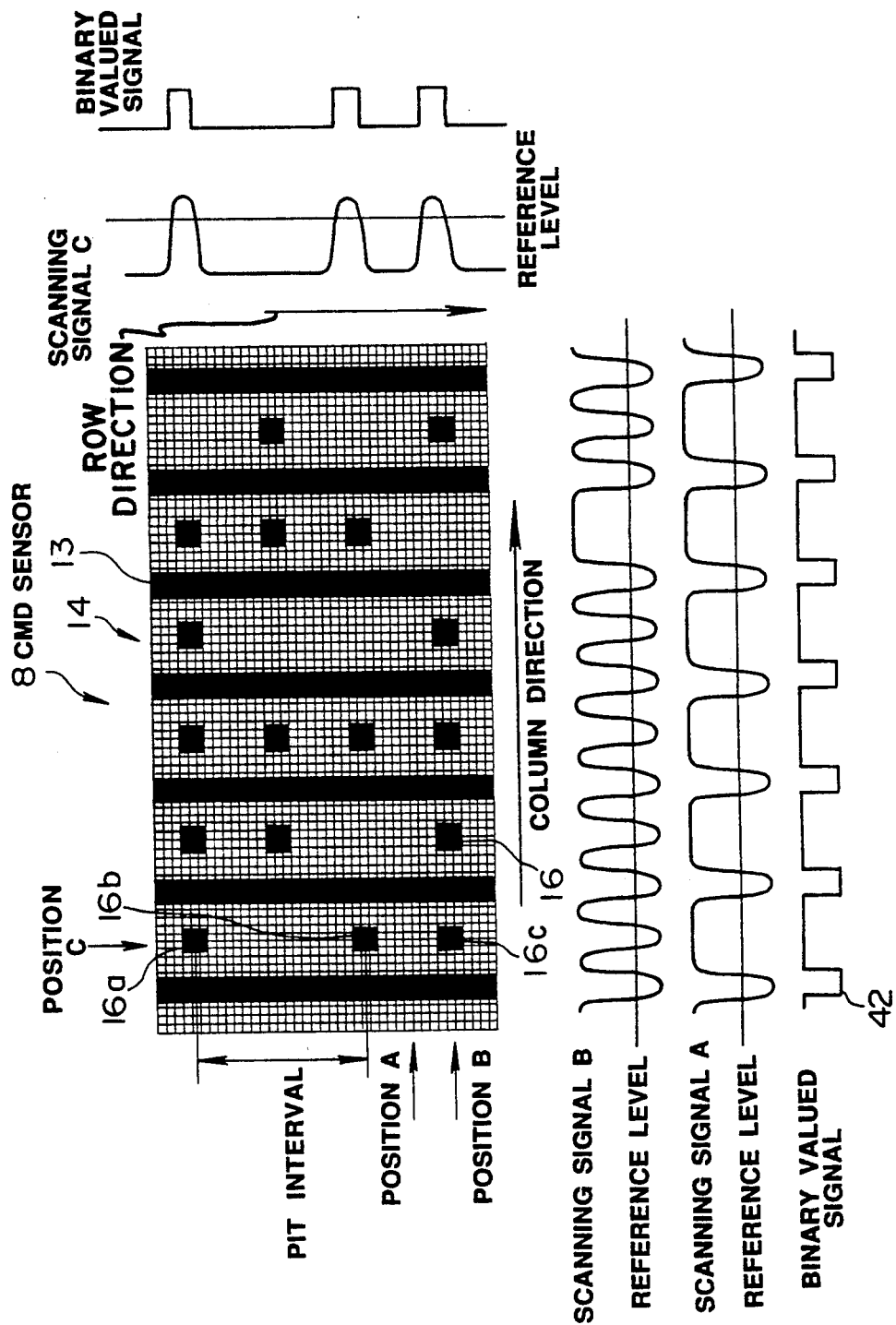

Referring to FIGS. 7-10, the description will be given regarding the operation of the optical card reproducing apparatus of the first embodiment, which has the structure described above. Note that FIG. 8 illustrates the image of the recording pattern of the optical card 1 of FIG. 4 wherein the image is formed on the surface of CMD sensor 8.

As described in FIG. 7, in step 1 (denoted S1 or in similar way hereafter), the optical card reproducing apparatus flashes the light source, i.e., light emitting device 2.

In S2, the timing controller 33 gives the specified row and column addresses to the row address generator 31 and the column address generator 32, respectively, so that CMD sensor 8 is scanned along a fixed specified row address in the column direction. For example, as shown in FIG. 8, the scanning signal along the row at position B includes the signals from the data pits 16 and from the track guides 13 which is used for detecting the data pits 16 on the track 14. However, in this case, the result of comparison at the comparator 40 makes the gate circuit 41 closed, thus the track guide column address holding circuit 43 does not hold any address corresponding to the scanning signal B. Then, scanning is carried out along a different row, for example, row A. In this case, there is no data pit on the track 14, the scanning signal along row A includes only the signal from the track guide 13. As a result, the gate circuit 41 becomes open, and the track guide column address holding circuit 43 holds the column addresses corresponding to the scanning signal A. In this way, the scanning signal containing only the signal from the track guide 13 is detected, and the binary valued signal 42 corresponding to the track guide is obtained (level "L" corresponds to the track guide), thus the column addresses of the track guide are obtained. The timing controller 33 calculates the middle address between the two column addresses of adjacent track guides. The calculated middle address is stored as the column address of the data pits 16.

Figure 9:
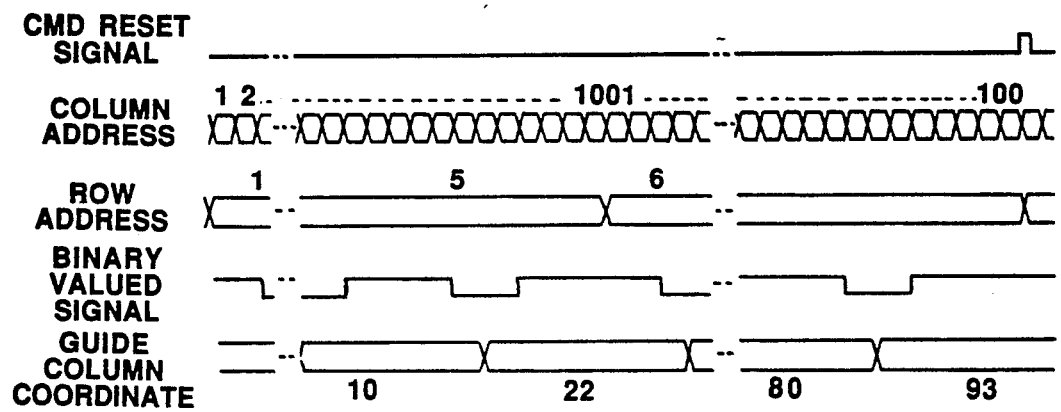

FIG. 9 is a timing chart of this process described above.

In S3, the timing controller 33 specifies the column address of the data pits 16 which has stored in S2 and gives the specified row and column addresses to the row address generator 31 and the column address generator 32, respectively, so that the scanning is carried out along the specified column in the row direction. Therefore, when the column address of position C is specified, the scanning signal C along that column in the row direction will be a signal corresponding to the data pits 16a, 16b, 16c..., as shown in FIG. 8. Furthermore, in S3, the scanning signal along a column in the row direction is converted into the binary valued signal with the binary value converter 34. In S4, the data interval detector 36 detects the interval between the data pits from the binary valued signal obtained in S3 and from the row and column addresses corresponding to the binary valued signal. In S5, the decoder 38 reproduces the data by decoding the data pit interval obtained in S4.

Figure 10:
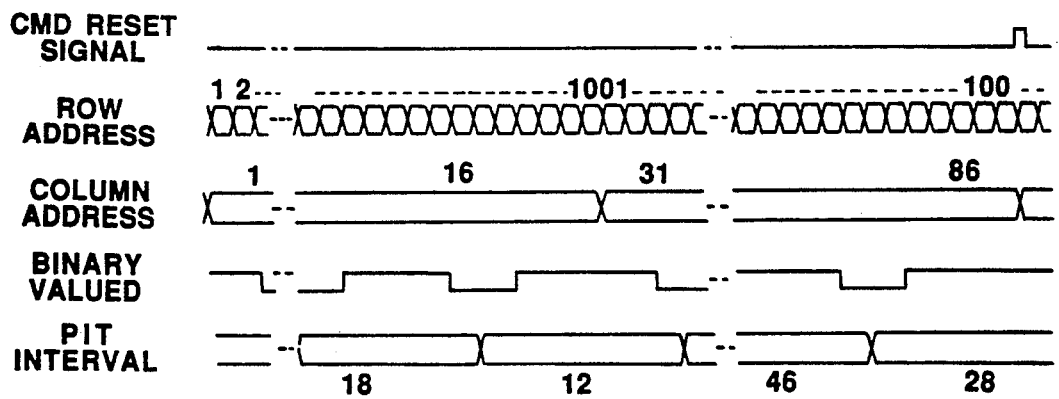

The timing during this process is shown in FIG. 10.

As described above, the optical card reproducing apparatus of embodiment 1 reproduces the data with no movement of the optical card 1 during the reproducing process and it directly decodes the intervals of the recorded data pits. Thus, accurate decoding and reproducing of the data are possible.

A second embodiment of the present invention will be described next.

The structure of the optical card reproducing apparatus of the second embodiment is essentially the same as that of the first embodiment except that the image of a part of an optical card 1, including at least the plurality of tracks, is formed on the CMD sensor, while the image of the whole optical card 1, including at least ID areas and the whole of data storage areas, is formed on the CMD sensor 8 in the case of first embodiment.

That is, referring to FIG. 1, the CMD sensor 8a of the second embodiment of the present invention functions is described as follows: the light emitting device 2 is flashed; the desired data is obtained; the CMD sensor 8a is reset to discharge the charges; the card driving unit 11 drives the optical card 1 to move; and the light emitting device 2 is re-flashed to obtained the following data. In this way, data is obtained and decoded part by part.

As for the timing of flash lighting, if the flash lighting time is short enough compared to the movement speed of the optical card 1, the flash lighting may be performed during the continuous movement of the optical card 1 with no stopping. Alternately, the flash lighting may be performed between the intermittent movement of the optical card 1 in such a way that the movement of the optical card 1 is stopped and the light is flashed then the optical card 1 is moved again.

Figure 11:
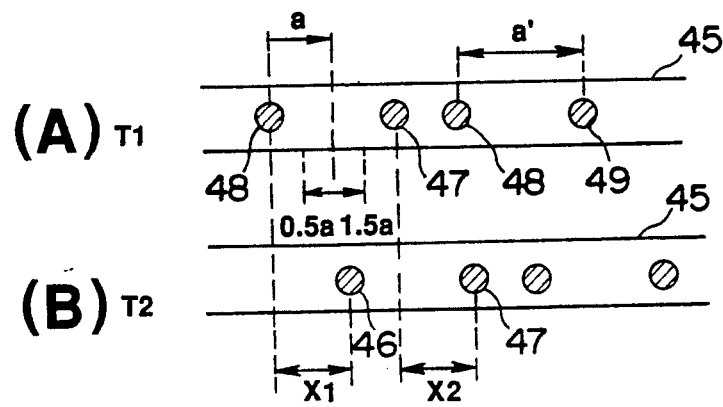

In the optical card reproducing apparatus of the second embodiment, as shown in FIG. 11, the flash lighting cycle is based on the time required for the optical card 1 to move along the minimum data pit interval a. The image of a track 45 is formed on the CMD sensor 8a as shown in FIG. 411(A) at the time T1, then at the time T2 when the next flash lighting is carried out the image has been moved as shown in FIG. 11(B).

The image of data pits 46 and 47 formed on the CMD sensor 8a should be moved by the minimum data pit interval a when the time passes from T1 to T2. However, in reality, there is some deviation from the accurate minimum data pit interval a due to the jitter such as the fluctuation in the movement speed of the optical card 1 or in the recording position of the data pits.

However, it is reasonable to expect that the data pits 46 and 47 will be located near the positions which are some distance away from the previous portion by the minimum data pit interval a.

Figure 12:
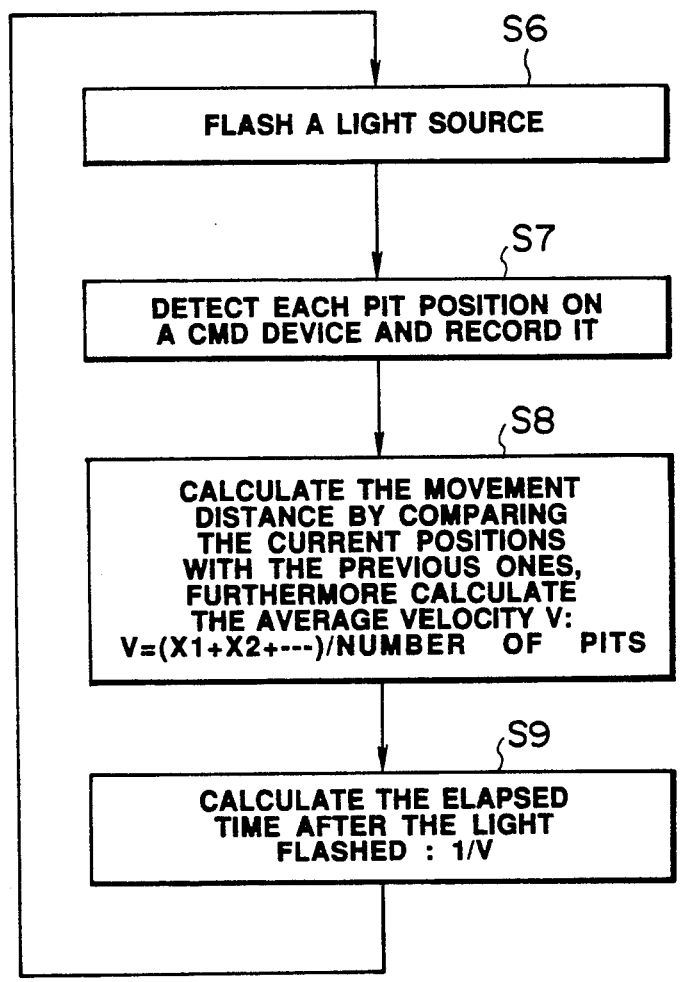

Therefore, in the second embodiment of the present invention, as shown in FIG. 12, the timing controller 33 flashes the light source, i.e., the light emitting device 2 in S6, then in S7, the positions of the data pits 46, 47... on the CMD sensor 8a are detected, then it is checked if the data pits are located at the positions which are away by the distance during the range from $0.5a$ to $1.5a$ from the positions where the pits were located when the light flashed previously. If the pits are located in the above range, then the movement amounts $x1, x2...$ are taken as the movement amounts of the data pits 46, 47... and the positions of the data pits are calculated from these movement amounts and the results are stored.

Furthermore, in S8, the timing controller 33 calculates the average of the actual movement amounts of the whole data pits, and calculates the actual movement velocity V, of the optical card 1. In S9, based on the calculated movement velocity V, the signal for flashing the light emitting device is generated with the timing which cancels any effect due to jitter such as the fluctuation in the movement of the optical card 1.

In this way, the data will be decoded sequentially from the top of each track. The reading sequence will be described for the data on a specified track. First, the optical head 15 is moved in the direction perpendicular to the track direction 26 so that the image of the target track is formed on the CMD sensor 8a. The decoding of the data is started from the top of an arbitrary track and decoding is continued with the intermittent driving of the card driving unit 11 until the track number is identified. As a result of the identification of the track number, let us assume that it turns out, for example, that the identified track is different by two tracks from the target track. Then, in this case, to get the desired data, the CMD sensor 8a is retrieved in the column direction crossing the track guide twice, and the data on the track there will be decoded. In this way, the data on the target track can be obtained.

In the above example, as for the track number, the track number of certain one track is decoded. However, alternatively, the whole track numbers of the tracks whose images are on the CMD sensor 8a may be decoded for retrieving the target track.

As described above, in the second embodiment of the present invention, the effect of jittering is suppressed to the minimum possible value, and it is possible to accurately follow the movement of the optical card 1. Furthermore, the decoded signal is generated directly from the data pit intervals, thus it is possible to perform accurate reproduction of the data.

In the above example, the flash lighting cycle is based on the time required for the optical card 1 to move along the minimum data pit interval a. However, the flash lighting cycle is not limited to this. It may be based on the time required for the optical card 1 to move by the distance a' between the data pits 48 and 49 in FIG. 11. In this case, the number of flashing cycles will be decreased and the number of the data pits which can be used in averaging for the jitter correction will also be decreased.

In the above example, the actual movement velocity of the optical card 1 is determined by averaging the actual movement values of the whole data pits. However, alternately, the actual movement velocity of the optical card 1 may be determined only from the movement amount x1 in FIG. 11.

Now, a third embodiment of an optical card reproducing apparatus of the present invention will be described.

The optical card reproducing apparatus of the third embodiment is similar to that of the first embodiment. Therefore, the same composing elements will be denoted by the same sign, and the only different elements of the structure will be described.

Figure 13:
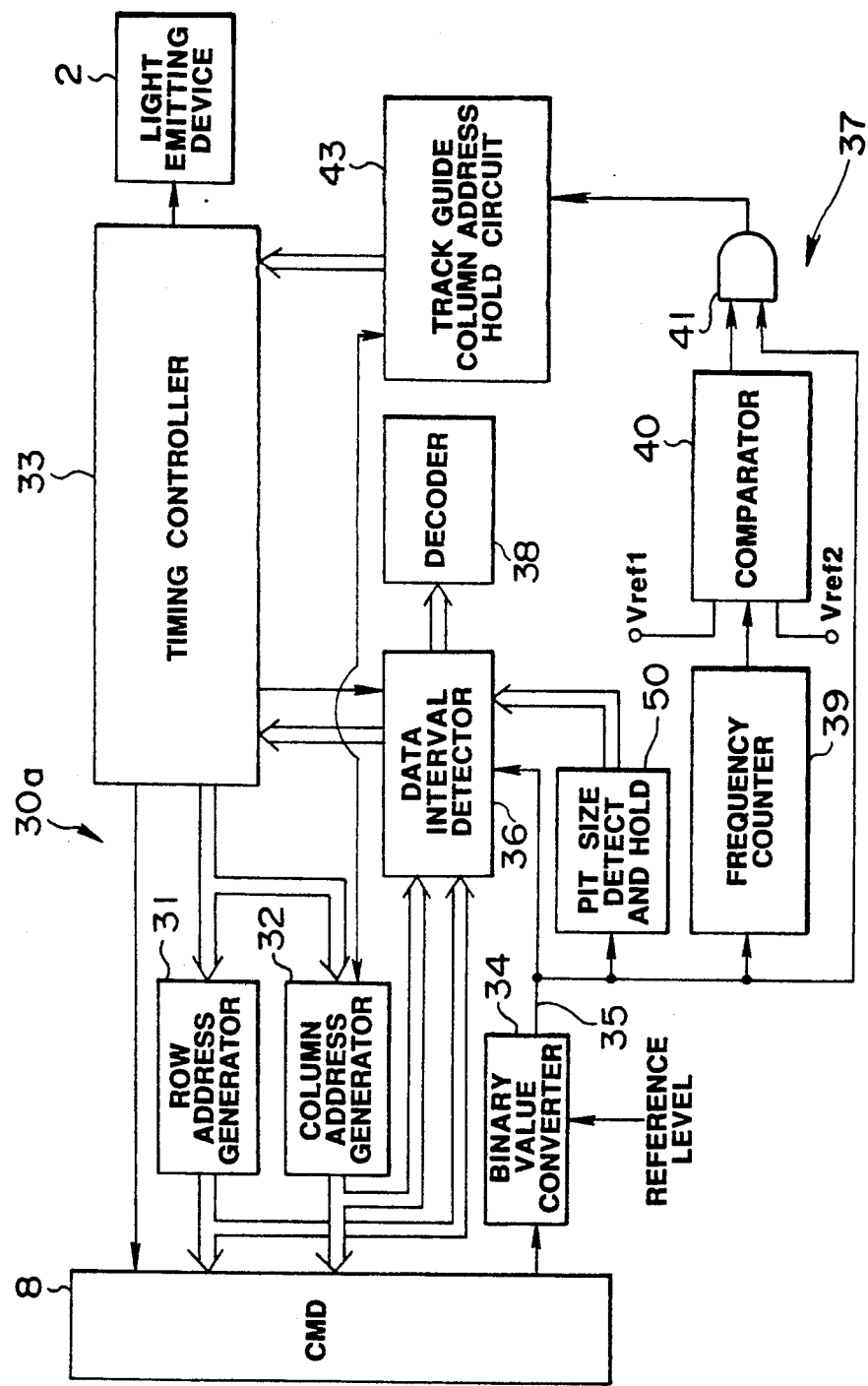

As shown in FIG. 13, in the third embodiment of the present invention, the CMD control circuit 30a includes a pit size detecting/holding circuit 50 which detects the pit size from the binary valued signal 35 outputted from the binary value converter 34 and which holds the resultant data pit size. The data interval detector 36 makes a decision whether the detected data pit size given by the pit size detecting/holding circuit 50 corresponds to data pits or some dust on the recording surface of the optical card 1 or some dust in the optical system for detecting the data pits. If it is decided that the result of the detection represents the actual pit size, then the data pit intervals are detected and the resultant data pit intervals are outputted to the decoder 38.

The other composing elements are the same as those in the first embodiment.

Figure 16:
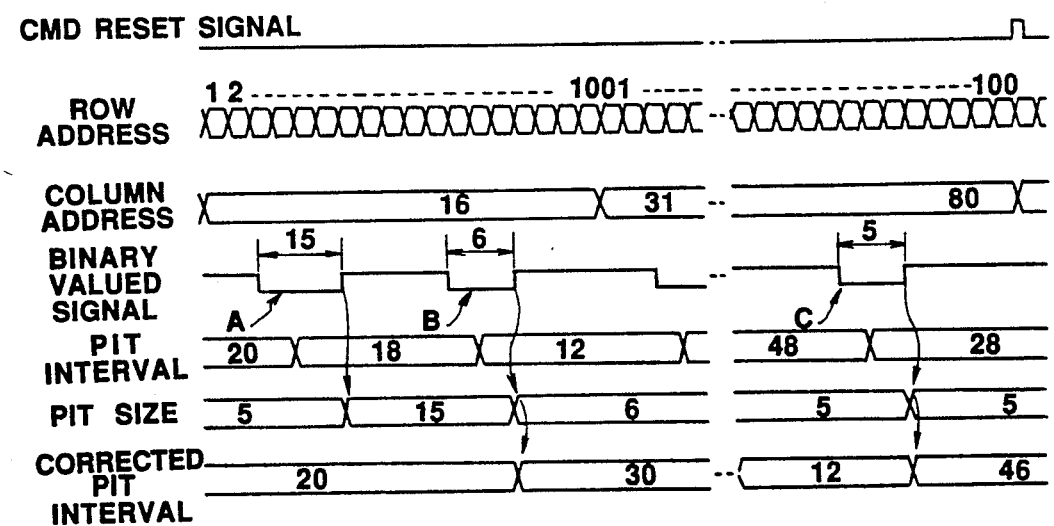
Figure 14:
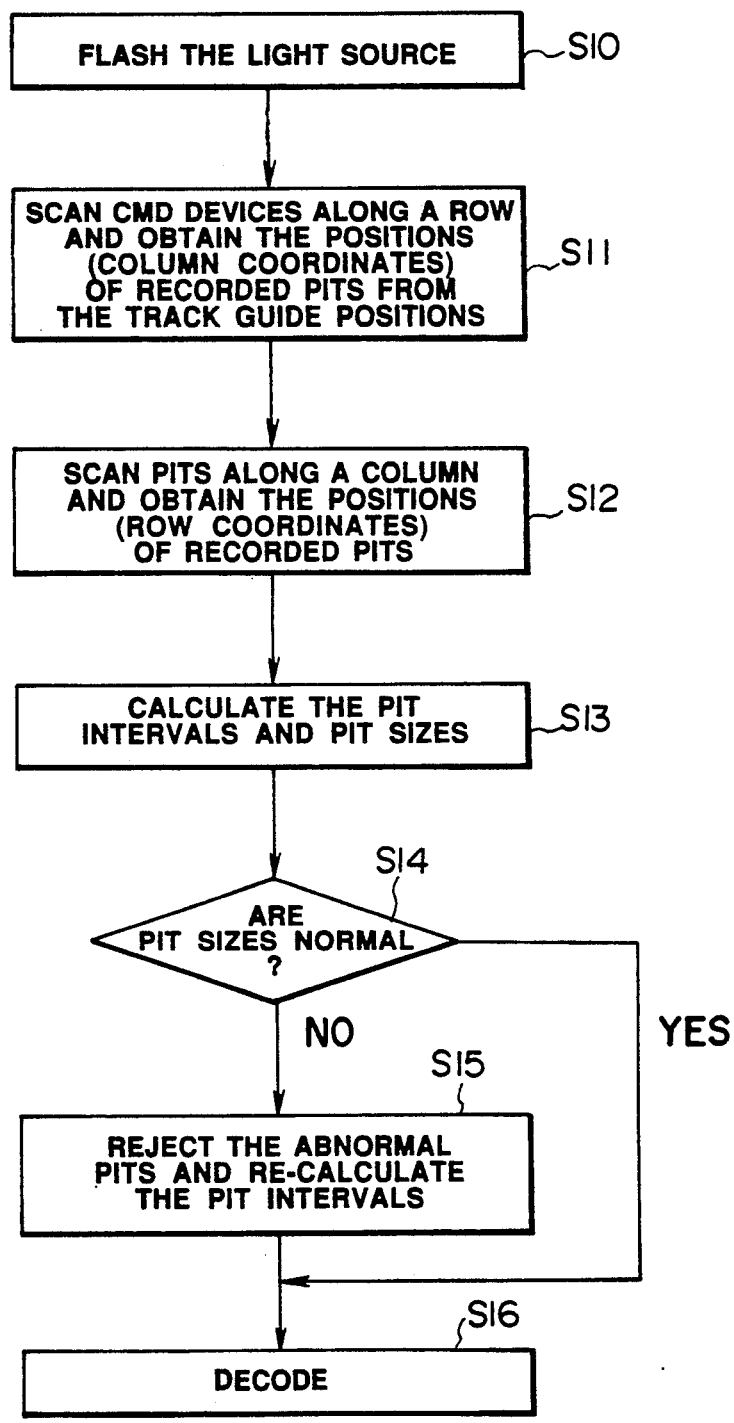
Figure 15:
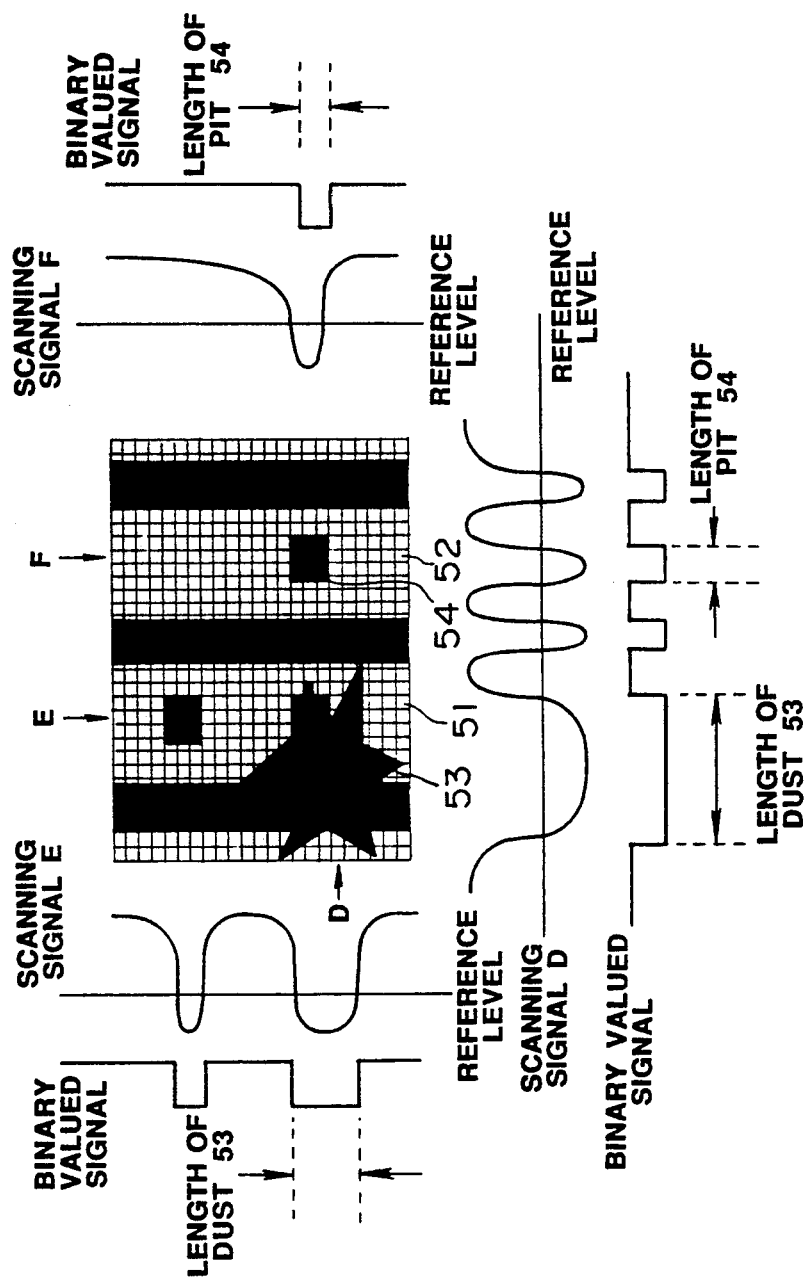

Referring to FIGS. 14-16, the operation of the optical card reproducing apparatus of the third embodiment, which has the above structure, will be described next.

As shown in FIG. 14, the optical card reproducing apparatus flashes the light emitting device 2, which is the light source in S10.

In S11, the timing controller 33 gives the specified row and column addresses to the row address generator 31 and the column address generator 32, respectively, so that the CMD sensor 8 is scanned along the fixed specified row in the column direction. In a similar way, as in the first embodiment, the scanning signal including only the signal from track guides is detected to obtain the binary valued signal corresponding to the track guides. Thus, the column addresses of the track guides are obtained. The timing controller 33 calculates the middle address between the obtained column addresses of adjacent track guides. The calculated middle address is stored as the column address of the data pits.

The timing during the above process is similar to that of the first embodiment, as shown in FIG. 9.

In S12, the timing controller 33 specifies the column addresses of the data pits stored in S11 and gives the specified row and column addresses to the row address generator 31 and the column address generator 32, respectively, so that the scanning is carried out along the fixed specified column in the row direction. Similarly, as in the first embodiment, the binary valued signal corresponding to the data pits is obtained. In S13, the pit size detecting/holding circuit 50 detects the pit size from the binary valued signal obtained in S12. Furthermore, the data interval detector 36 detects the interval between the data pits from the row and column addresses corresponding to the binary valued signal obtained in S12.

In the operation of detecting the data pit size by the data pit size detecting/holding circuit 50, as shown in FIG. 15, when the scanning is carried out along column E in the row direction on the track 51 having the dust 53 on it, the reflection factor will change in the dust area, thus the binary valued signal of the scanning signal E includes the signal corresponding to the length of the dust 53 in the scanning area of the dust 53. When the scanning is carried out along column F in the row direction on the track 52 which has no dust on it, the binary valued signal of the scanning signal F will be a signal corresponding to the length of the data pits 54 in the row direction in the scanning area of the pits 54. In this way, the pit size detecting/holding circuit detects and holds the data pit size.

In S14, the data interval detector 36 makes a decision whether the data pit size detected and held in the pit size detecting/holding circuit 50 corresponds to the data pits which are in the predetermined desired range of the pit size. When the pit size is in the predetermined desired range, the process will proceed to S16 in which the data pit interval will be outputted to the decoder 38 for decoding. When abnormal data pit sizes out of the predetermined range are included, the process will proceed to the S15 in which the abnormal pits will be removed and the correction will be calculated in the data pit intervals. Then, in S16, the corrected data pit intervals are outputted to the decoder 38 for decoding.

The timing of the above process is shown in FIG. 16. In this FIG. 16, for example, the length of pulse A in the binary valued signal is 15 which is different from the normal length of 5-6 as in the case of pulse B, C . . . . Therefore, pulse A corresponds to an abnormal pit. Accordingly, while the pit size detecting/holding circuit 50 holds data pit size for the pulse A, the data interval detector 36 does not output the data pit interval 18 to the decoder 38, so that this pit is treated as if it does not exist. Then, when the pit size detecting/holding circuit 50 detects 6 as the length of pulse B in the binary valued signal which corresponds to normal data pits, the data interval detector 36 adds the present data pit interval of 12 and the previous data pit interval of 18 and outputs this corrected data pit interval of 30 to the decoder 38.

The other operations are the same as those in the first embodiment.

In the above description of the third embodiment, the detection of the abnormal pits is carried out during the scanning along a column in the row direction, but the detection method is not limited to this. The detection of the abnormal pits may be carried out during the scanning along a row, for example, along row D in the column direction, to obtain the binary valued signal corresponding to the length of dust 53 in the column direction. From this binary valued signal, the pit size detecting/holding circuit 50 may detect the data pit size and hold it.

As described above, in addition to the effects of the first embodiment, the optical card reproducing apparatus of the third embodiment has another effect that abnormal signals due to the dust on the recording surface of the optical card 1 or the dust in the optical system for detecting the data pits can be removed and the decoding is carried out directly from the detected data pit intervals, so that the accurate decoding or reproducing of the data is possible regardless of the existence of the dust.

Now, a fourth embodiment of an optical card reproducing apparatus of the present invention will be described. The optical card reproducing apparatus of the fourth embodiment has the structure similar to that of the second embodiment. Therefore, the same composing elements will be denoted by the same sign, and the only different elements of the structure will be described.

Figure 17:
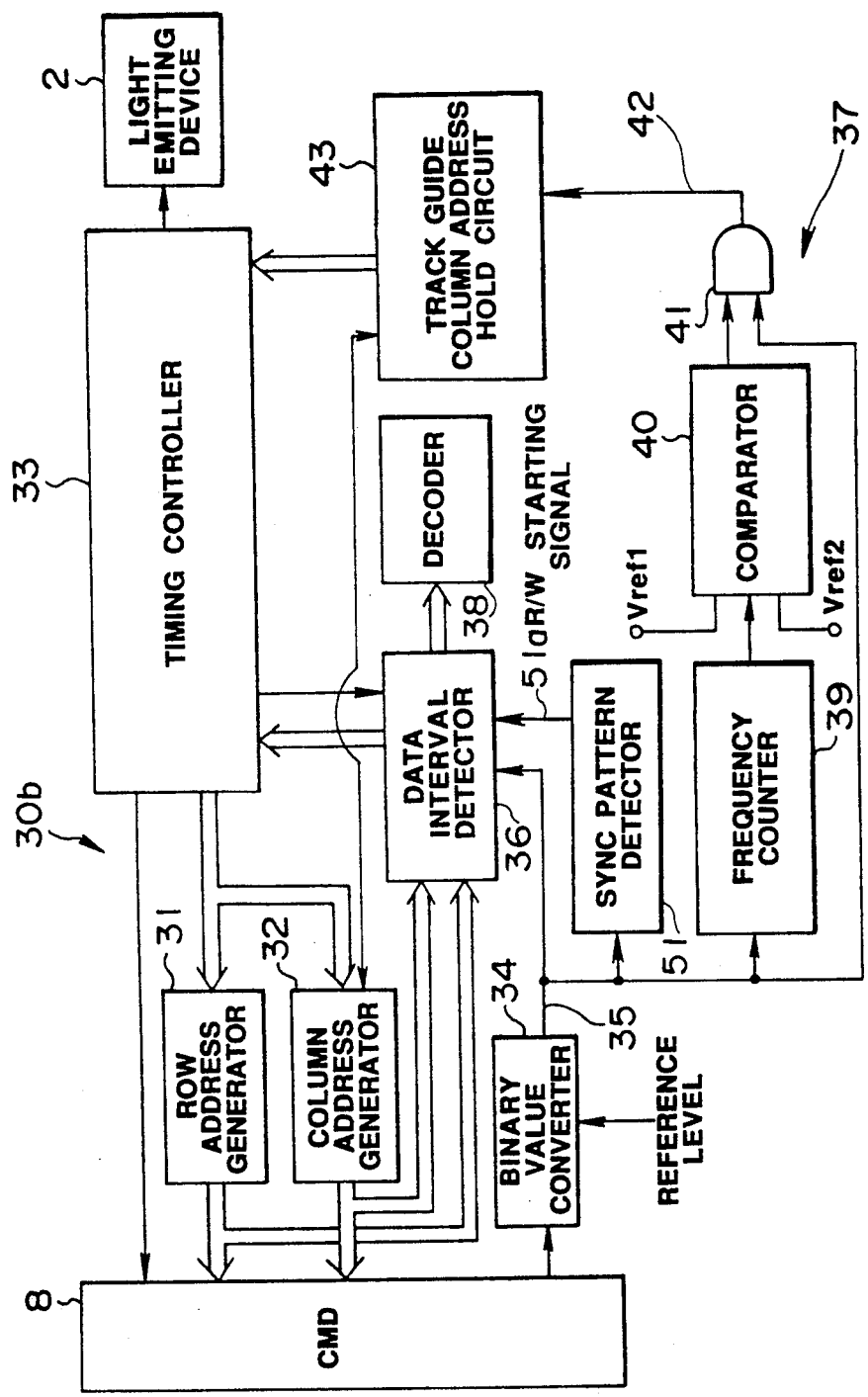

As shown in FIG. 17, a CMD control circuit 30b of the fourth embodiment includes a sync pattern detector 51 which detects a sync pattern in the binary valued signal converted into the binary value from the added signal of the CMD sensor 8a, for example, in the row direction with the binary value converter 34, to generate a read/write (R/W) starting signal 51a which will be applied to the data interval detector 36. The other composing elements are the same as those in the second embodiment.

Figure 18:
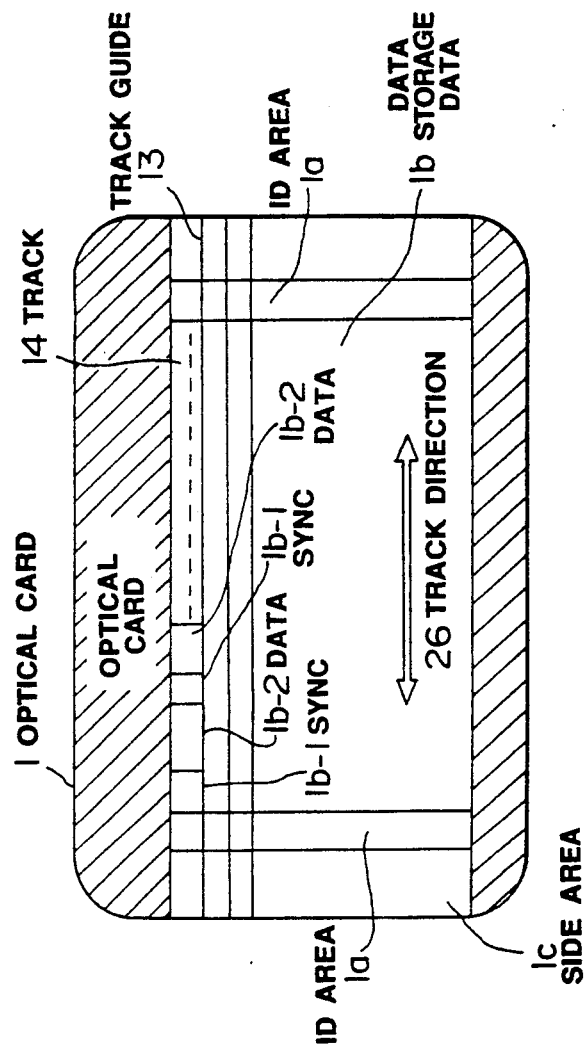

As shown in FIG. 18, the data storage area 1b of the optical card 1 includes plural SYNC areas 1b-1 in which sync patterns are recorded and data areas 1b-2 following the SYNC areas.

Figure 19:
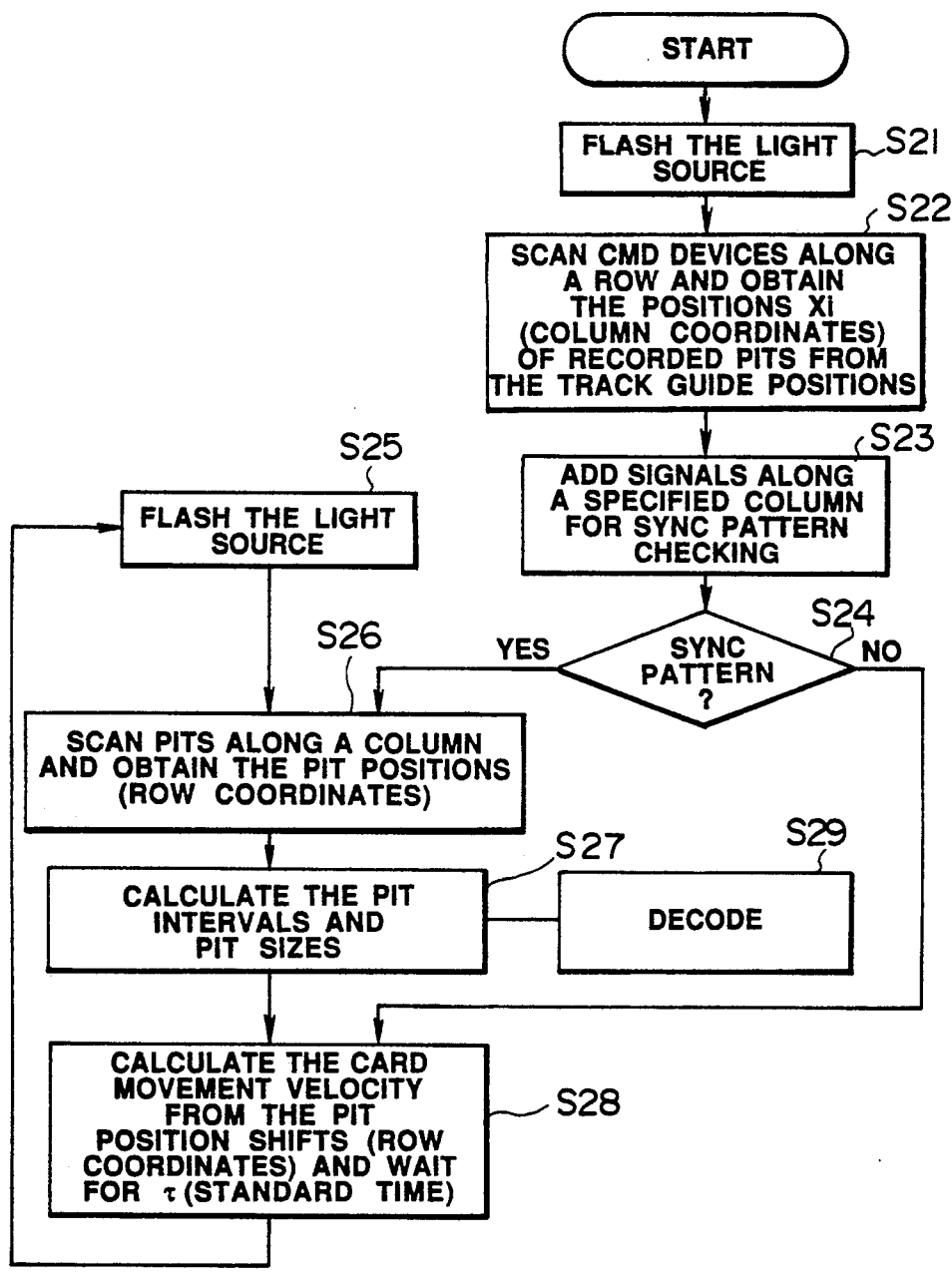
Figure 20:
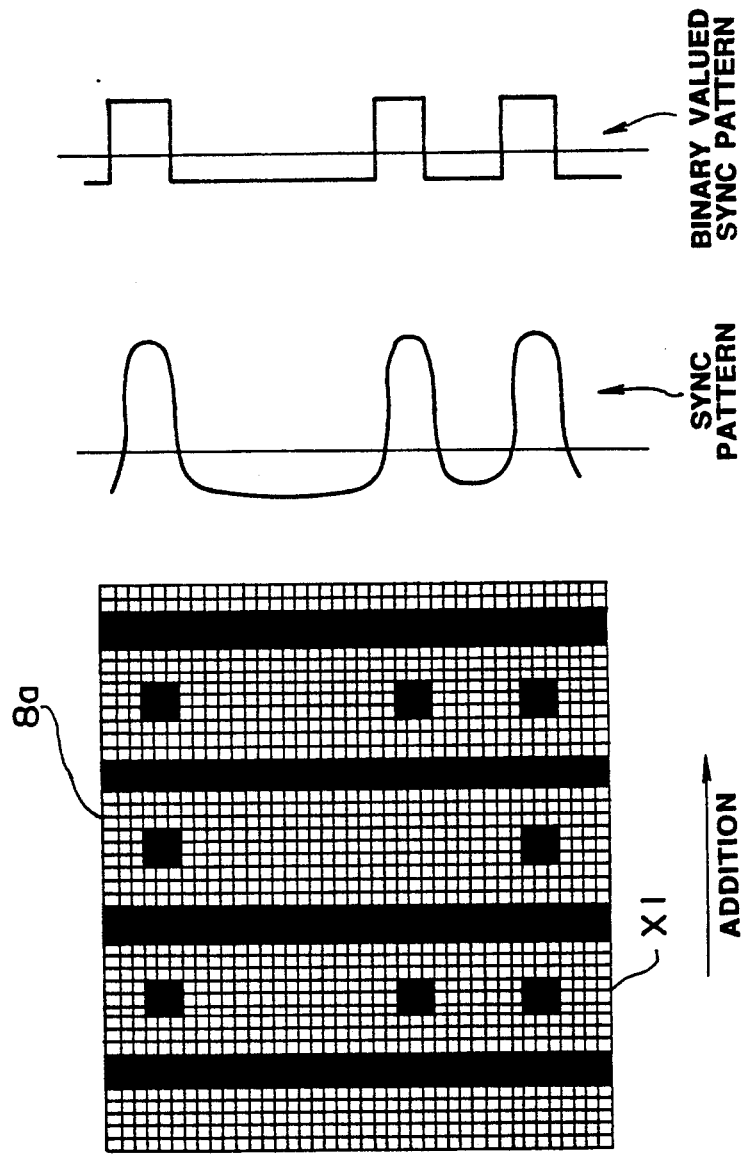

Referring to FIGS. 19 and 20, and also FIGS. 8–11 which have been used for explanation of the first and second embodiments, the operation of the optical card reproducing apparatus of the fourth embodiment, which has the above structure, will be described next.

As shown in FIG. 19, in S21, the optical card reproducing apparatus flashes the light source, i.e., the light emitting device 2. In S22, the timing controller 33 gives the specified row and column addresses to the row address generator 31 and the column address generator 32, respectively so that the CMD sensor 8 is scanned along the fixed specified row in the column direction (See FIGS. 8 and 9).

In S23, as shown in FIG. 20, the timing controller 33 gives the addresses of the specified plural tracks (having the column addresses Xi . . . ) of the CMD sensor 8 to the column address generator 32, so that signals are added in the column direction and the added sync pattern is converted to the binary valued sync pattern with the binary value converter 35, then the binary valued sync pattern is applied to a sync pattern detector 51. Therefore, even in the case that the sync pattern on a certain track can not be detected, for example due to the dust, the addition with the sync pattern on the adjacent track leads to the detection of the sync pattern. As well as the detection of the sync pattern, the sync pattern detector 51 calculates the starting positions of the data in the data area 1b-2 (FIG. 18) and outputs the R/W starting signal to the data interval detector 36.

In the case in which the image area of the CMD sensor 8a cannot cover the whole sync patterns, the card driving unit 11 drives the optical card to move in the row direction, scanning the whole sync patterns with repetition of the light flashing until the sync pattern corresponding to the starting position of the data area 1b-2 is detected.

In S24, if the sync pattern is detected then the process proceeds to S26. If the sync pattern is not detected then the process proceeds to S28.

In S25, re-flashing of the light emitting device 2 is carried out.

In S26, when the sync pattern is detected, the timing controller 33, as shown in FIG. 8, specifies the column address of the data pits 16 which was stored in S22 and sets the next position of the sync pattern as the starting position of the data pits to the row address generator 31, and furthermore, gives the specified row and column addresses to the row address generator 31 and the column address generator 32, respectively so that the scanning is carried out along the fixed specified column in the row direction. For example, when the scanning is carried out along column C, the scanning signal C corresponds to the data pits 16a, 16b, 16c . . . , and the signal is converted to the binary valued signal with the binary value converter 34. In S27, the data interval detector 36 detects the data pit interval from the binary valued signal obtained in S27 and from the row and column addresses corresponding to this binary valued signal.

In S28, the timing controller 33 stores the row and column addresses of the data pit, and furthermore compares the present row and column addresses with the previous addresses of the data pit to calculate the movement velocity of the optical card. After the minimum pit recording time 1τ passed, the timing controller 33 resets the CMD sensor 8 to discharge the charges, then makes the card driving unit 11 drive the optical card 1 to move, and re-flashes the light sources, i.e., the light emitting device 2, thus returning to S26. In FIG. 11, for example, the light flashing cycle is based on the time required for the optical card 1 to move by the minimum data pit interval a. The image of the track 45 is formed on the CMD sensor 8 as shown in FIG. 11(A) at the time T1, then at the time T2 when the next light flashing is carried out, the image has been moved as shown in FIG. 11(B).

The same process is repeated to store the pit intervals, then in S29, the decoder 38 reproduces the data by decoding the data pit intervals obtained in S27.

The timing in the above process is shown in FIG. 10.

As described above, in the optical card reproducing apparatus of the fourth embodiment, the sync pattern is detected via the binary value converter from the sync pattern signal which is addition of the plural sync patterns. As a result, even if there are some dust or defects on the targeted track, or even if the driving speed of an electric motor is fluctuated, accurate sync pattern detection is assured without being affected by such a disorder. Thus, it is possible to perform the accurate reading and writing of the data using these sync patterns.

Now, a fifth embodiment of an optical card reproducing apparatus of the present invention will be described. The optical card reproducing apparatus of the fifth embodiment has the structure similar to that of the second embodiment. Therefore, the same composing elements will be denoted by the same sign, and the only different elements of the structure will be described.

Figure 21:
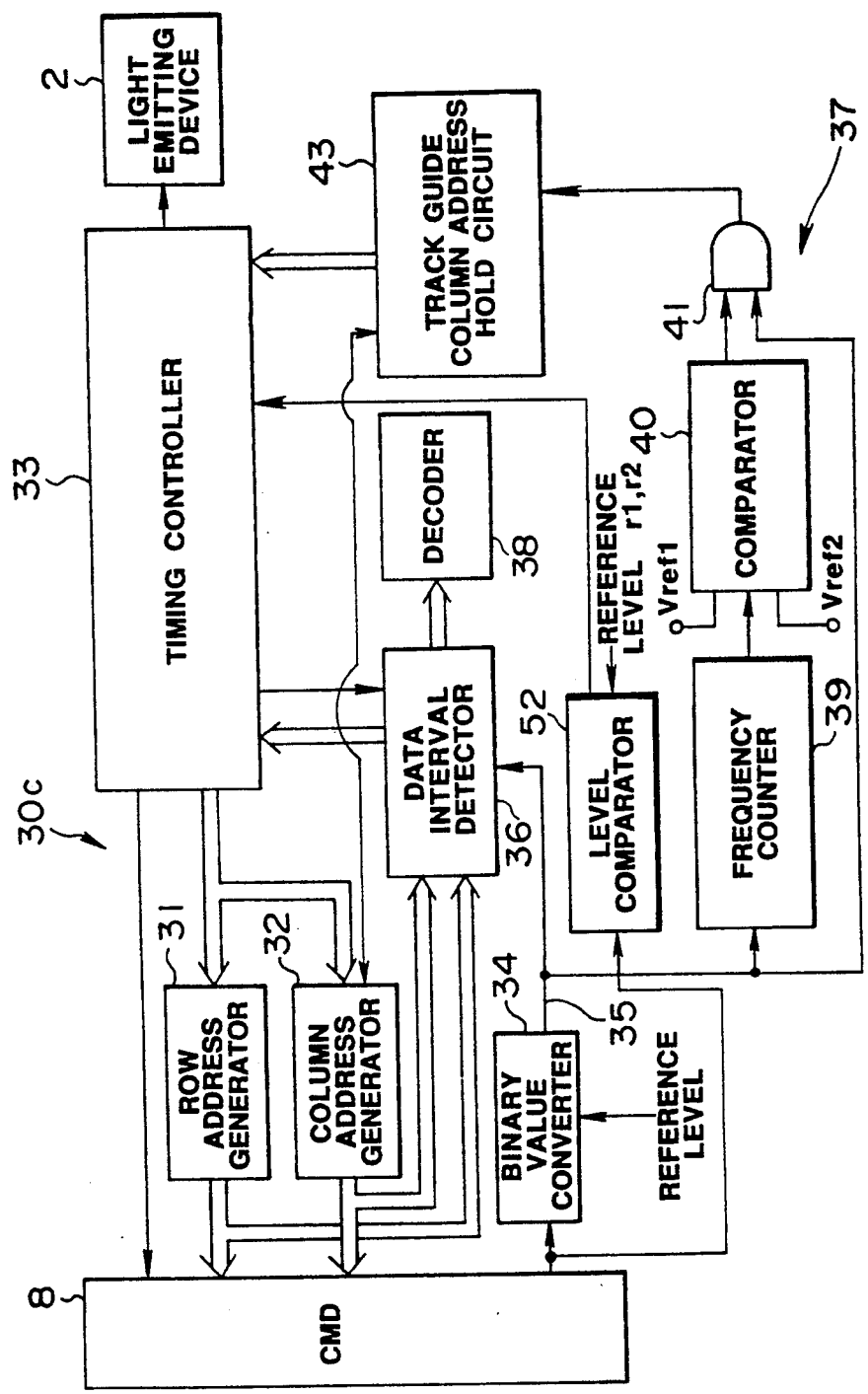

As shown in FIG. 21, the CMD control circuit 30c of the fifth embodiment includes a level comparator 52 which compares the signal obtained by adding the signals of the CMD sensor 8a, for example, in the row direction, with the predetermined reference levels r1 and r2 to make decision on the states of the recording areas wherein the result of the decision will be applied to the timing controller 33. The other composing elements are the same as those in the second embodiment.

Figure 22:
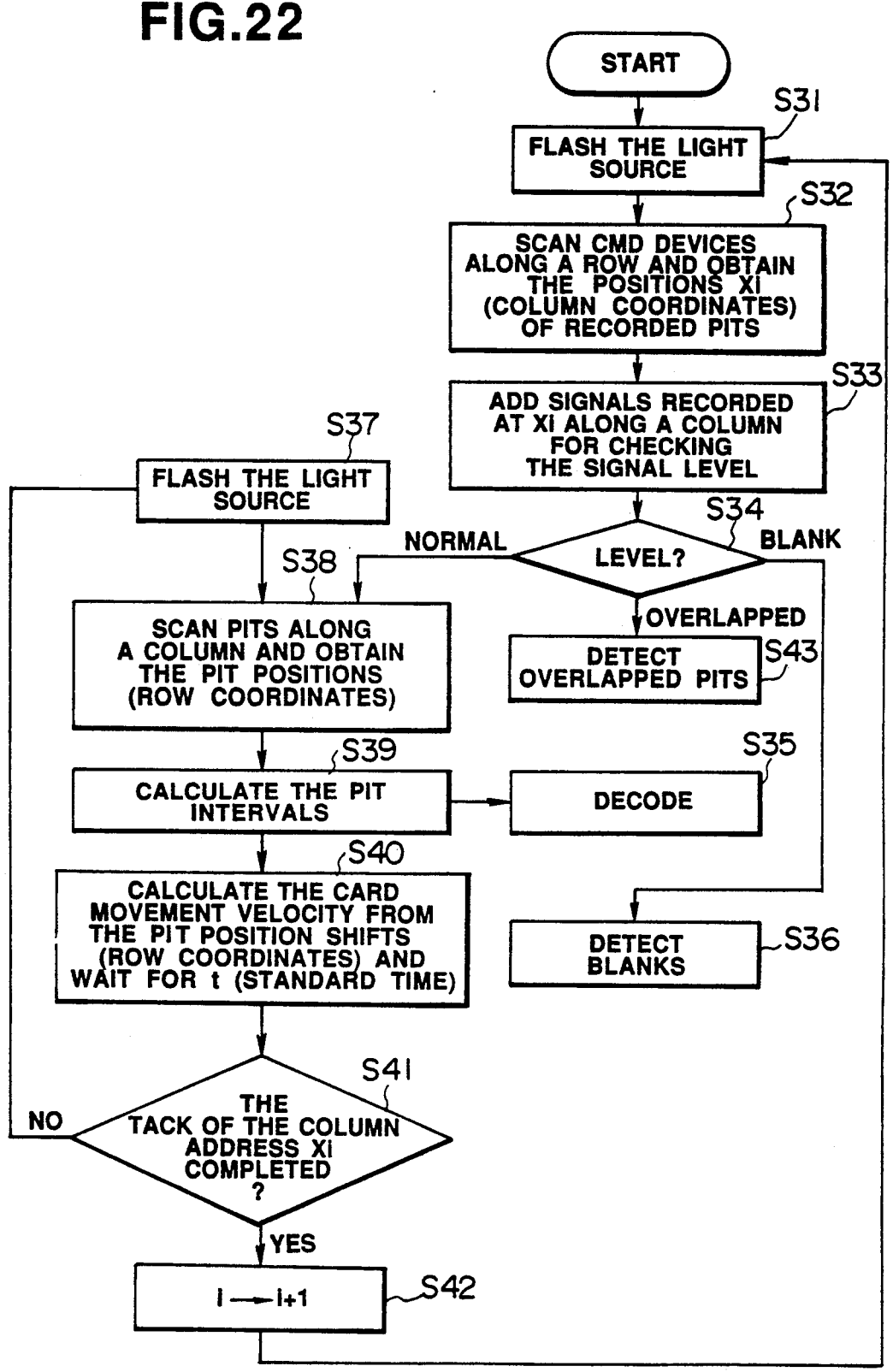
Figure 23:
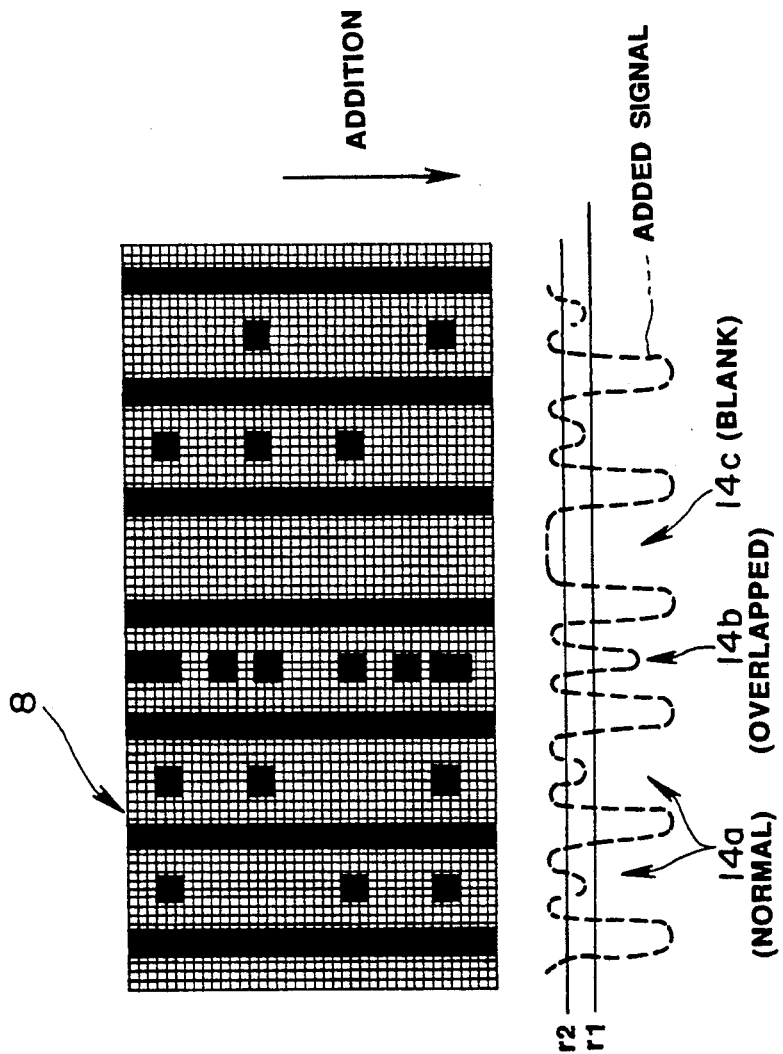

Referring to FIGS. 22 and 23, and also FIGS. 8–11 which have been used for explanation of the first and second embodiments, the operation of the optical card reproducing apparatus of the fifth embodiment, which has the above constitution, will be described next.

As shown in FIG. 22, in S31, the optical card reproducing apparatus flashes the light source, i.e., the light emitting device 2. In S32, the timing controller 33 gives the specified row and column addresses to the row address generator 31 and the column address generator 32, respectively so that the CMD sensor 8 is scanned along the fixed specified row in the column direction (See FIGS. 8 and 9).

In S33, as shown in FIG. 23, the timing controller 33 adds the signals in the row direction along the specified column corresponding to the column address of the data pit 16 which is stored in S32. The resultant added signal is applied to the level comparator 52. For example, the added signal level of the normal recording tracks 14a will be between the r1 and r2. In the case of the duplicated-recording track 14b, the added signal level will be r1 and below. The blank track will gives the added signal level r2 and over. Thus, the level comparator 52 makes decision on the added signals along a fixed column having the column address Xi. The result of the decision is applied to the timing controller 33. The timing controller 33 stores the states of tracks having the column address Xi. The decision is made once for the part near the starting area of each track, and this will give the good enough decision as for the recorded tracks, even for the tracks on which duplicated data have been recorded by mistake and the later writing process was stopped before the writing process was completed, because in any case for the recorded tracks, there must be data pits recorded in the starting areas of the tracks.

In S34, if the level comparator 52 decides that the track is a duplicated-recording track then the process proceeds to S35 to perform the duplicated recording detection process. In the case of the blank track, the process proceeds to S36 to perform the blank detection process. If the track is normal, then the process proceeds to S38. In duplicated-recording tracks, data were recorded twice, therefore, as shown in FIG. 23, the duplicated recording detection can be accomplished by detecting the track 14b which shows the added signal level r1 and below, with the level comparator 52. In blank tracks, there is no data recorded on the tracks, therefore the blank detection can be accomplished by detecting the track 14c which shows the added signal level r2 and over.

In S37, re-flashing of the light emitting device 2 is carried out.

In S38, the timing controller 33 specifies the column address of the data pits 16 which was stored in S32 and gives the specified row and column addresses to the row address generator 31 and the column address generator 32, respectively so that the scanning is carried out along the fixed specified column in the row direction. For example, when the scanning is carried out along column C, the scanning signal C corresponds to the data pits 16a, 16b, 16c . . . and the signal is converted to the binary valued signal with the binary value converter 34. In S39, the data interval detector 36 detects the data pit interval from the binary valued signal obtained in S38 and from the row and column addresses corresponding to this binary valued signal.

In S40, the timing controller 33 stores the row and column addresses of the data pit, and furthermore compares the present row and column addresses with the previous addresses of the data pits to calculate the movement velocity of the optical card. After the minimum pit recording time $1\tau$ has passed, the timing controller 33 resets the CMD sensor 8 to discharge the charges, then the process proceeds to S41. In S41, the decision is made whether the data interval detection in S39 has been completed for the whole data pits on the track of the column address Xi. If the data interval detection is not completed yet, then the card driving unit 11 drives the optical card 1 to move, and the process returns to S37 to perform the re-flashing of the light source, i.e., the light emitting device 2. In FIG. 11, for example, the light flashing cycle is based on the time required for the optical card 1 to move by the minimum data pit interval a. The image of the track 45 is formed on the CMD sensor 8 as shown in FIG. 11(A) at the time T1, then at the time T2 when the next light flashing is carried out, the image has been moved as shown in FIG. 11(B).

The same process is repeated to store the pit intervals, then in S43, the decorder 38 reproduces the data by decoding the data pit intervals obtained in S39. In the case of writing data on a blank track, at this time (at the beginning of the track), the track is decided as a blank and the writing/reading of data will be started.

In S41, if the decision is made that the data interval detection has been completed for the whole data pits on the track of the column address Xi, then the process proceeds to S42 in which i is incremented by 1. Then, the process returns to S31 and the same process is repeated for the track of the column address $X_{i+1}$.

The timing in the above process is as shown in FIG. 10.

In the above description, the detection is carried out for both of the duplicated and blank tracks, however the detection may be performed for one of duplicated tracks and blank tracks.

As described above, in the optical card reproducing apparatus of the fifth embodiment, it is possible to make a quick and accurate decision on the recording state of tracks whether the track is normal, duplicated, or blank, by judging from the added signal level of the CMD sensor 8a with the level comparator 52. Thus, a normally recorded data can be accurately decoded.

An optical card reproducing apparatus of a sixth embodiment of the present invention will be described next. In this embodiment, the light emitting device is not activated in synchronism with the driving of the optical card, but the data is read with a continuously radiated light source.

The optical card reproducing apparatus of the sixth embodiment has a structure similar to that of the second embodiment. Therefore, the same composing elements will be denoted by the same sign, and the only different elements of the structure will be described.

In the optical card reproducing apparatus of the sixth embodiment, the CMD control circuit includes, as in the second embodiment, the track guide column address holding circuit 43, the row address generator 31, the column address generator 32, the timing controller 33, and the binary value converter 34.

Figure 24:
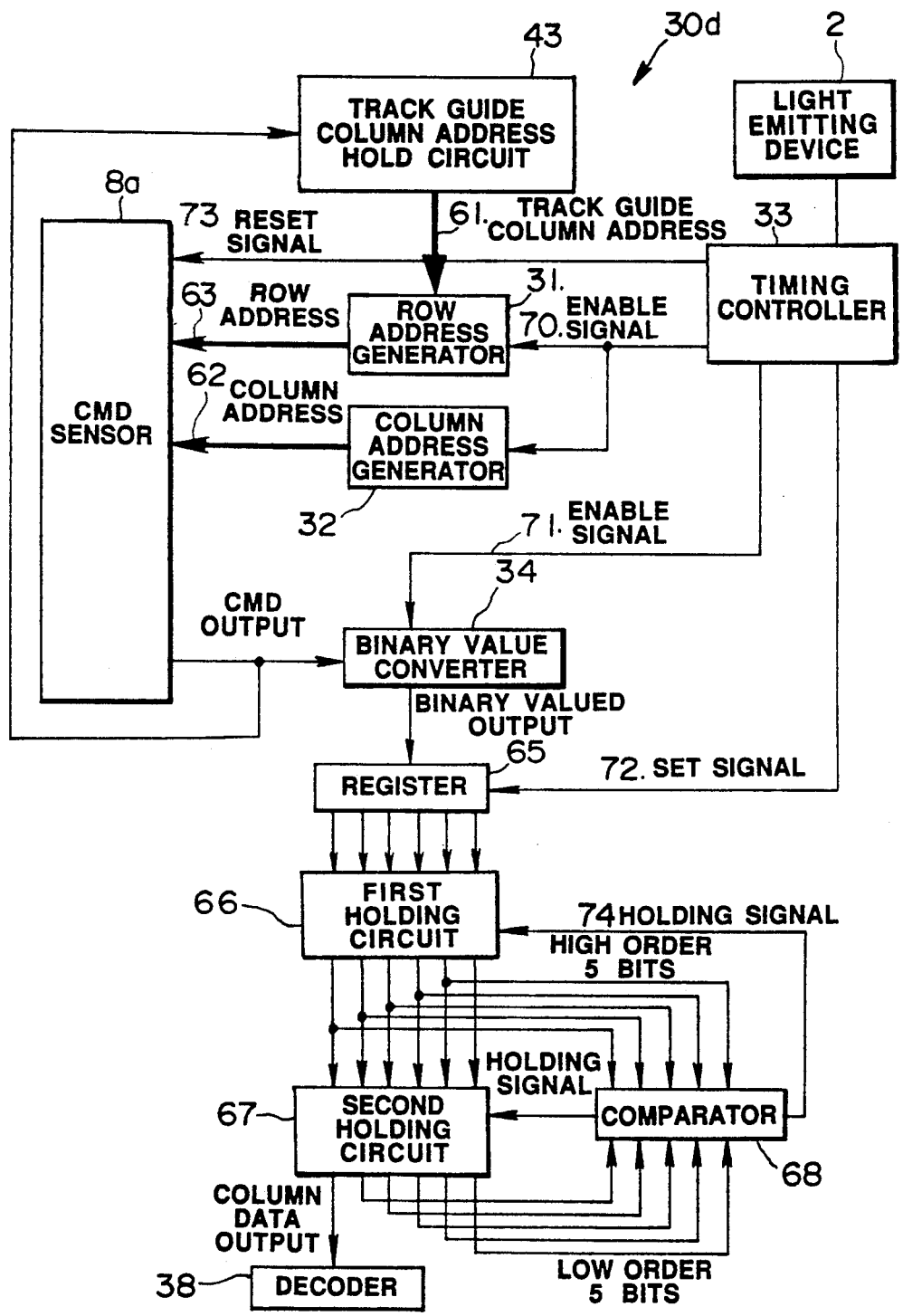

As shown in FIG. 24, in the CMD control circuit 30d, based on the track guide column address 61 outputted from the track guide column address holding circuit 43, the row address generator 31 and the column address generator 32 apply a row address signal 63 and a column address signal 62 to the CMD sensor 8a, respectively.

The CMD control circuit 30d further includes a register 65 for converting a serial digital signal into a 6-bit parallel signal wherein the digital signal is obtained from the binary value converter 34 which converts the signal from the CMD sensor 8a into the binary value, a first holding circuit 66 for holding the 6-bit parallel signal obtained from a register 65, a second holding circuit 67 for holding the previous 6-bit parallel signal which had been held in the first holding circuit 66, so that the first holding circuit can hold the new 6-bit parallel signal obtained from the register 65, and a comparator 68 for comparing the high order 5-bit data of the 6-bit parallel signal held in the first holding circuit 66 with the low order 5-bit data of the 6-bit parallel signal held in the second holding circuit 67, wherein when the comparator 68 makes decision that the high order 5-bit data is consistent with the low order 5-bit data, the second holding circuit 67 outputs the most significant bit of the data it holds, and a decoder 38a reproduces the information taking this most significant bit as data.

In this embodiment, the track guide column address holding circuit 43 obtains the track guide column address 61 in a way similar to that in the second embodiment.

In this sixth embodiment, just for illustration, the recorded signal is assumed to be modified-frequency-modulated (MFM).

Figure 26:
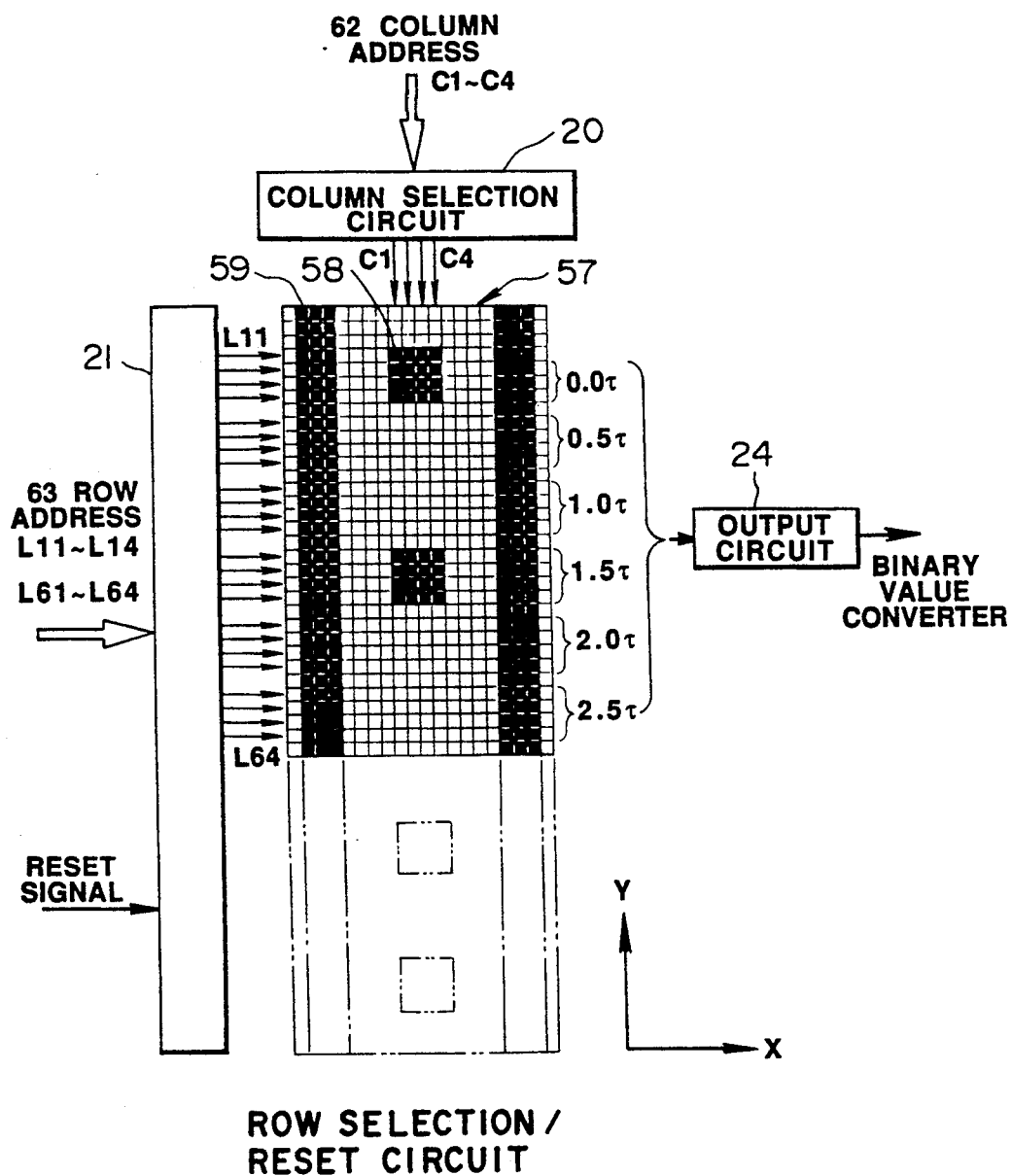

Furthermore, the image of one pit is assumed to be formed on the 4×4 pixels of the CMD sensor 8a as shown in FIG. 26.

In the optical card reproducing apparatus of the sixth embodiment which has the structure described above, the image of the recording surface of the optical card 1 is formed on the image surface of the CMD sensor 8a. The optical card driver unit 11 (See FIG. 1) drives the optical card 1. Referring to FIG. 26, in the MFM-signal recorded on a track 57 of the optical card 1, the longest pit interval is $2.5\tau$ for sync patterns where $1.0\tau$ is the minimum interval of the data pits 58. When rows L11–L14 correspond to the position $0.0\tau$ of the recorded MFM-signal, then rows L21–L24, L31–L34, L41–L44, L51–54, and L61–64 correspond to the positions $0.5\tau$, $1.0\tau$, $1.5\tau$, $2.0\tau$, and $2.5\tau$, respectively. In this way, based on the relationship between the pit intervals and the pixel intervals of the CMD sensor 8a, the row addresses of the MFM-signal can be generated with the row address generator 31. In this embodiment, $1.0\tau$ corresponds to ten pixels. On the other hand, column C1–C4 can be specified by the column address 62 of the track 57 which is generated by the column address generator 32 based on the column address 61 of the track guide 59 applied by the track guide column address detector 43.

The operations, such as specifying of the address by the timing controller 33, outputting of the binary valued signal, inputting of signals to the register, and holding and comparing of signals for outputting the sequence of data, are carried out while the image of the recording surface of the optical card moves on the image surface of the CMD sensor 8a. Therefore, these operations must be performed quickly enough according to the movement velocity of the image, for example, in FIG. 24, the sequence of the data such as "100100" must be set to the register 65 quickly enough. In other words, a large number of comparing operations for parallel data must be carried out per unit time, or otherwise the comparison would not be done at the time for the data to be consistent with each other, thus there would be a possibility that a sequence of incorrect data might be outputted.

In the sixth embodiment, the data recorded on the optical card 1 are read spacially. Therefore, referring to FIG. 27, the time required for specifying the row address must be set to be short enough. Because the light beam is continuously generated during the sequential operation of specifying row addresses to produce CMD outputs, the CMD sensor 8a continues to sense images, thus movement of the optical card 1 results in a change in position of the pit images formed on the CMD sensor 8a. That is, if too much time had passed since the first of row address had been set till the last of the row address was set, the image corresponding to the last of the row address at the time when the first of the row address was set would be different from the image corresponding to the last of the row address at the time when the last of the row addresses was set. This would lead to a failure in spacially reading the data. The time required for specifying the row addresses should be short enough to assure that the deviation of the image is small enough (for example, in FIG. 26, at most, one pixel) such that bits of the last of the row addresses at the time when the first of row addresses was set would be same as the bits of the last of row addresses at the time when the last of row addresses was set.

Figure 27:
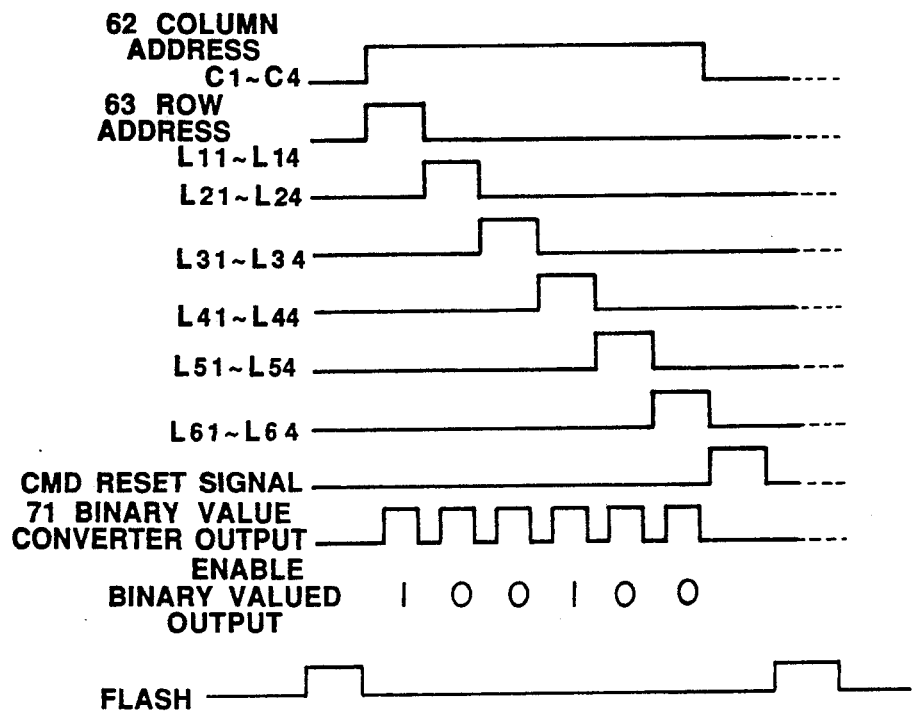

As shown in the timing chart of FIG. 27, the address signals described above are sequentially specified in the order of $0.0\tau$, $0.5\tau$, $1.5\tau$, $2.0\tau$, and $2.5\tau$ by an enable signal 70 from the timing controller 33 in FIG. 24, and each resultant CMD output is applied to the binary value converter 34. When the enable signal 71 is applied to the binary value converter 34 from the timing controller 33, the binary value converter 34 converts the CMD output into the binary value based on the predetermined threshold level and outputs the resultant binary valued signal. Based on a set signal 72, the binary valued signals are applied sequentially to the register 65, so that each bit from the highest order to the lowest order bit of the 6-bit data sequence set to the register represents respectively each of the binary valued outputs corresponding to the positions from $0.0\tau$ to $2.5\tau$. When the applying of the 6-bit data sequence to the register is completed, the CMD sensor 8a is reset by a reset signal 73 to form and store the next image.

The above operations, such as specifying of the addresses, outputting of the binary valued signal, and inputting of the signal to the register are controlled by the timing controller 33.

Figure 25:
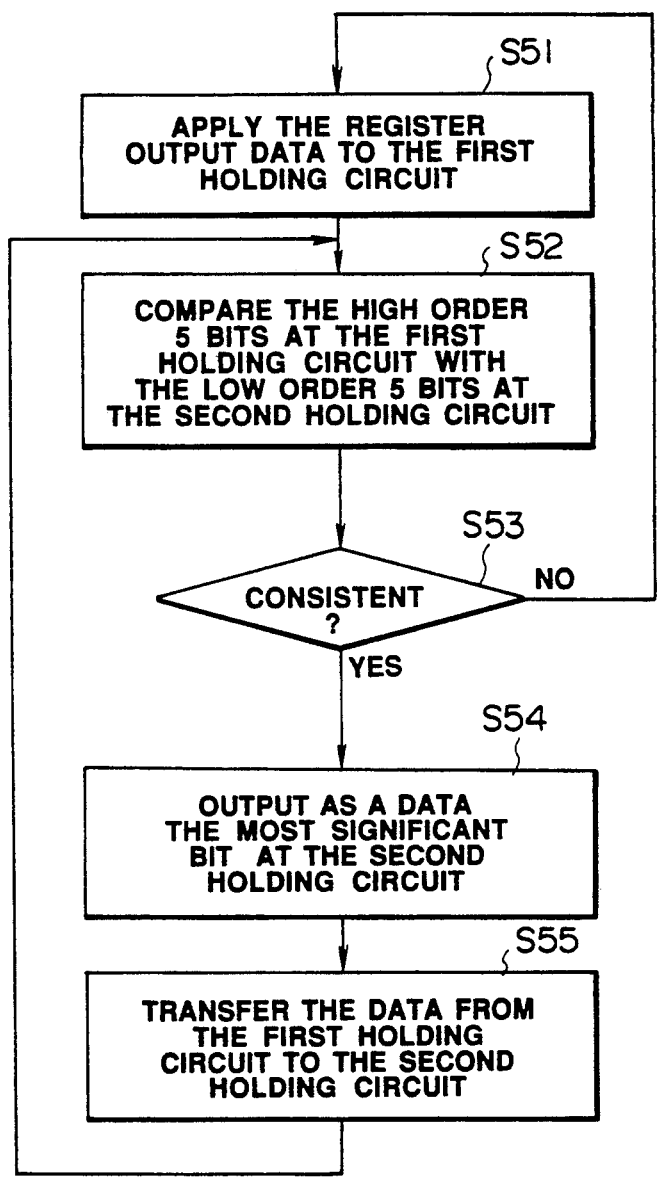

Now, the operation of reproducing the data will be described, referring to the flow in FIG. 25. In S51, the 6-bit data sequence in the register 65 is applied to the first holding circuit 66, based on a holding signal 74. In S52, the comparator 68 compares the high order 5 bits in the first holding circuit with the lower order 5 bits in the second holding circuit 67. In S53, when all bits are consistent with corresponding bits, the process step proceeds to S54 in which the data in the register 65 is applied to the first holding circuit 66 in which the new data will be held, while the second holding circuit 67 outputs the highest order bit as a data sequence output. In S55, the data in the first holding circuit 66 is applied to the second holding circuit 67, so that the second holding circuit 67 holds this as a new data.

In the case of an inconsistency, the process step returns to S51 in which the first holding circuit 66 obtains and holds the 6-bit data sequence in the register 65, and the second holding circuit 67 maintains the present data.

The above operations must be performed quickly enough compared to the movement velocity of the optical card 1, that is, the movement velocity of the image on the CMD sensor 8a.

Figure 28:
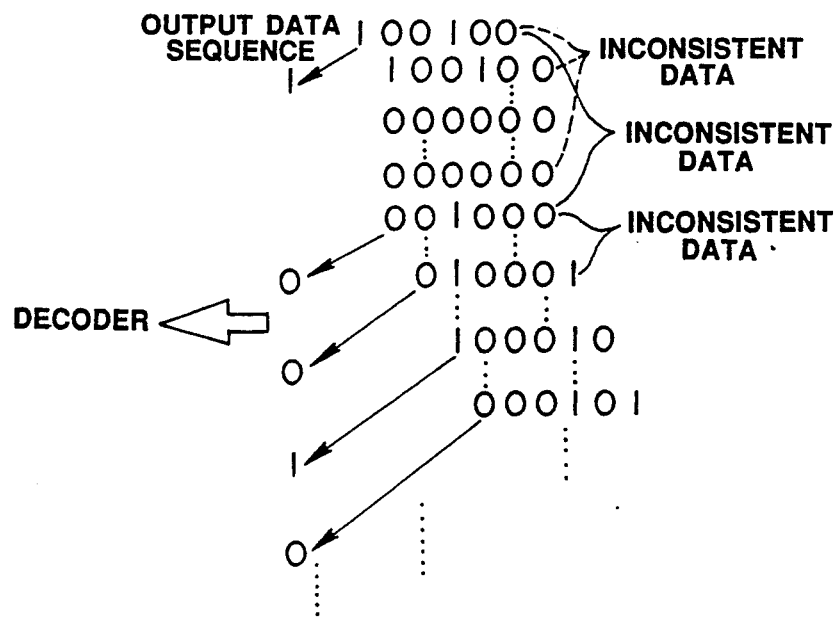

More specifically, as shown in FIG. 28, while the image moves for $0.5\tau$, the continuous inconsistency in the data occurs and the data in the first holding circuit 66 is cancelled. When the image further moved to give the shift of $0.5\tau$, the higher order 5 bits in the first holding circuit 66 would be consistent with the lower order 5 bits in the second holding circuit 67 and the desired data bit is outputted. By repeating the same process steps to spacially read the binary valued signals recorded spacially via the pixels fixed on the CMD, the output data sequence is applied to the decoder 38 sequentially every $0.5\tau$ of the image shift, and the decoder 38 decodes the recorded data. Even if there exists a fluctuation in the movement velocity of the image, there is no effect in the obtained data while the change might occur in the number of the cancelled data.

As described above, the data recorded on the optical card 1 can be read not as in time sequence but spacially. As a result, the modulated data can be read and decoded directly from the positions at which the pits are recorded with no effect from the fluctuation in the movement velocity due to the optical card driving system. Thus, the accurate reading of the data can be accomplished with no clock signal for synchronization.

In the above description, the light beam is generated continuously; however, it may be flashed after the CMD is reset, as be described earlier, referring to FIG. 27.

It will be apparent that a wide variety of the modified embodiments in the present invention are possible without departing from the spirit and scope of the invention. It is to be understood that the present invention is not limited to the above specific embodiments, and that the scope of this invention is defined by the claims appended hereto.

What is claimed is:

1. An optical card reproducing apparatus, comprising:

an irradiation means for irradiating a light beam on an optical card having a plurality of tracks for recording information as a sequence of pits on a recording surface and for focusing the light beam on said recording surface of said optical card, said tracks being divided by track guides;

a two-dimensional solid-state image sensing means for detecting changes in the optical characteristics of said light beam irradiated onto said optical card, said two-dimensional solid-state image sensing means having a plurality of photoelectric conversion elements distributed on a plane wherein a reading area can be specified by a row address in a row-direction and a column address in a column-direction;

a row address generating means for generating said row address of said plurality of photoelectric conversion elements;

a column address generating means for generating said column address of said plurality of photoelectric conversion elements;

a binary value conversion means for converting image signals from said two-dimensional solid-state image sensing means into binary values;

a track guide detection means for detecting either a row address or a column address corresponding to said track guide from said binary valued signals outputted from said binary value conversion means;

a first calculation means for calculating either a row address or a column address of said sequence of pits from either a row address or a column address of said track guide detected by said track guide detection means; and a detection means for detecting said sequence of pits from said binary valued signals outputted from said binary value conversion means by setting either a row address or a column address of said sequence of pits, which is calculated by said first calculation means, into said row address generating means or into said column address generating means, respectively, and by sequentially changing over the address generating means which is not set to an address increasing by one address, on the basis of a predetermined address.

2. An optical card reproducing apparatus as defined in claim 1, further comprising:

a second calculation means for calculating a size of pits of said sequence of pits detected by said detection means;

a third calculation means for calculating a pit interval between individual pits of said sequence of pits detected by said detection means;

wherein when the size of the pits calculated by said second calculation means is within a predetermined range, said second calculation means calculates a pit interval between individual pits of said sequence of pits.

3. An optical card reproducing apparatus as defined in claim 1, wherein an image sensed by said two-dimensional solid-state image sensing means includes at least an image of a data recording area containing said tracks and said track guides in said optical card and an image of an address area specifying each of said tracks.

4. An optical card reproducing apparatus as defined in claim 1 or 2, further comprising:

a moving means for moving said optical card in either said row direction or said column direction;

wherein said irradiation means irradiates a light beam intermittently onto said optical card moved by said moving means.

5. An optical card reproducing apparatus as defined in claim 4, further comprising:
- a velocity detection means for detecting a movement velocity of said optical card; and
- a timing control means for controlling an irradiation interval for irradiating said light beam, based on the movement velocity detected by said velocity detection means;
- wherein when said movement velocity increases, said irradiation interval is decreased and when said movement velocity decreases, said irradiation interval is increased.

6. An optical card reproducing apparatus as defined in claim 1, further comprising a pattern detection means for detecting specific recorded patterns on tracks by adding image signals from said two-dimensional solid-state image sensing means in a direction perpendicular to said tracks, on the basis of said row address generating means and said column address generating means;
- wherein when said specific recorded pattern is detected by said pattern detection means, reproducing of said sequence of pits is started.

7. An optical card reproducing apparatus as defined in claim 1, further comprising a track decision means for making a decision on a recorded state of said tracks by adding sequences of pits in a track direction, based on either row addresses or column addresses of said track guides detected by said track guide detection means.

8. An optical card reproducing apparatus as defined in claim 1, wherein said detection means further comprises:
- a conversion means for further converting binary valued signals from said binary value conversion means into sequential parallel data,
- a first storage means for storing parallel data converted sequentially by said conversion means,
- a second storage means for storing a parallel data converted prior to conversion of the parallel data stored in said first storage means and
- a comparison means for comparing the parallel data stored in said first storage means and with the parallel data stored in said second storage means,
- wherein the parallel data stored in said second storage means is replaced by the parallel data stored in said first storage means according to a result of comparison by said comparison means.

9. An optical card reproducing apparatus as defined in claim 8, further comprising:
- a decoding means for decoding a sequence of data bits outputted from said comparison means;
- wherein said comparison means compares a plurality of higher order bits of the parallel data stored in said first storage means with lower order bits of the parallel data stored in said second storage means, wherein the number of lower order bits is same as that of said higher order bits;
- wherein whenever said higher order bits are consistent with said lower bits, said second storage means outputs the highest order bit of the parallel data stored in said second storage means to said second calculation means; and
- the parallel data stored in said decoding means is replaced by the parallel data stored in said first storage means at the time when the comparison is carried out.

10. An optical card reproducing apparatus as defined in any of claims 1-3, 6-9, wherein said two-dimensional solid-state image sensing means is a Charge Modulation Device.

11. An optical card reproducing method comprising the steps of:
- irradiating a light beam on an optical card having a plurality of tracks for recording information as a sequence of pits on a recording surface and of focusing the light beam on said recording surface of said optical card, said tracks being divided by track guides;
- forming an image of a recording surface of said optical card on a two-dimensional solid-state image sensing means including a plurality of photoelectric conversion elements distributed on a plane;
- obtaining an image signal from said plurality of photoelectric conversion elements by specifying a row address, that is, an address in a row-direction, and a column address, that is, an address in a column-direction;
- converting the image signal obtained from said plurality of photoelectric conversion elements into a binary value;
- detecting either said row address or said column address corresponding to the image of said track guide formed on said two-dimensional solid-state image sensing means, based on the binary valued signal obtained in said converting step;
- calculating either said row address or said column address corresponding to the image of said sequence of pits, based on said row address or said column address corresponding to the image of said track guide obtained in said detecting step; and
- detecting said sequence of pits from the image signal obtained from said plurality of photoelectric conversion elements by specifying said row address or said column address of the image of said sequence of pits obtained in said calculating step, and by sequentially changing over said row address or said column address which is not specified to an address increasing by one address, on the basis of a predetermined address.

12. An optical card reproducing apparatus as defined in claim 4, wherein said two-dimensional solid-state image sensing means is CMD (charge modulation device).

13. An optical card reproducing apparatus as defined in claim 5, wherein said two-dimensional solid-state image sensing means is CMD (charge modulation device).

14. In an apparatus for reproducing information on an optical card having a plurality of tracks on its recording surface for recording information as a sequence of pits and track guides for separating the tracks, wherein said pits are detected by means of irradiating light reflected from said tracks onto a two-dimensional solid-state image sensing means, the improvement comprising:
- a binary value conversion means for converting image signals from said two-dimensional solid-state image sensing means into binary value signals;
- a track guide detection means for detecting a first address of said track guide;
- a first calculation means for calculating a second address of said sequence of pits from said first address of said track guide; and
- a detection means for detecting said sequence of pits from said binary valued signals outputted from said binary value converting means wherein said binary valued signals are specified by said second address.

15. The apparatus recited in claim 14, wherein both said first and second addresses consist of a row address component in a row direction and a column address component in a column direction.

16. The apparatus recited in claim 14, further comprising:
- a second calculation means for calculating a size of pits of said sequence of pits detected by said detection means; and
- a third calculation means for calculating a pit interval between individual pits of said sequence of pits detected by said detection means, wherein when the size of the pits calculated by said second calculation means is within a predetermined range, said second calculation means calculates a pit interval between individual pits of said sequence of pits.

17. The apparatus recited in claim 14, wherein an image sensed by said two-dimensional solid-state image sensing means includes at least:
- an image of a data recording area containing said tracks and said track guides in said optical card; and
- an image of an address area specifying each of said tracks.

18. The apparatus recited in claim 14, further comprising: a moving means for moving said optical card in either said row direction or said column direction, wherein said irradiation means irradiates a light beam intermittently onto said optical card moved by said moving means.

19. The apparatus recited in any of claims 14–18, wherein said two-dimensional solid-state image sensing means is a Charge Modulation Device.

20. An optical card reproducing method in which an optical card has a plurality of tracks on its recording surface for recording information as a sequence of pits and track guides for separating the tracks, wherein the pits are detected by means of irradiated light reflected from the tracks onto a two-dimensional solid-state image sensor, comprising the steps of:
- converting image signals from the two-dimensional solid-state image sensor into binary values;
- detecting a first address of the track guide;
- calculating a second address of the sequence of pits from the first address of the track guide; and
- detecting a sequence of pits from the binary valued signals specified by the second address.

21. The method of claim 20, wherein both said first and second addresses consist of a row address component in a row direction and a column address component in a column direction.

22. The method of claim 20, further comprising the step of calculating a size of pits of the detected sequence of pits, wherein when the calculated size of the pits is within a predetermined range, a pit interval is calculated between individual pits of the sequence of pits.

23. The method of claim 21, further comprising a means for moving the optical card in either the row direction or the column direction.

* * * * *